(12) United States Patent (10) Patent No.: US 7,475,277 B1
Holdman et al. (45) Date of Patent: Jan. 6, 2009

(54) AUTOMATED REPAIR OF DAMAGED OBJECTS

(75) Inventors: Jon Mark Holdman, Wheat Ridge, CO (US); Scott Cary Hammett, Golden, CO (US)

(73) Assignee: Storage Technology Corporation, Louisville, CO (US)

( * ) Notice: Subject to any disclaimer, the term of this patent is extended or adjusted under 35 U.S.C. 154(b) by 463 days.

(21) Appl. No.: 11/271,932

(22) Filed: Nov. 10, 2005

(51) Int. Cl.
*G06F 11/00* (2006.01)

(52) U.S. Cl. .......................................... 714/5; 714/755

(58) Field of Classification Search ................. 714/5–8, 714/42, 755, 758
See application file for complete search history.

(56) References Cited

U.S. PATENT DOCUMENTS

| | | | | |
|---|---|---|---|---|
| 5,504,858 | A * | 4/1996 | Ellis et al. ...................... | 714/6 |
| 5,592,497 | A * | 1/1997 | Lokhoff ...................... | 714/755 |
| 5,621,882 | A * | 4/1997 | Kakuta ........................... | 714/6 |
| 5,856,890 | A * | 1/1999 | Hamai et al. ................... | 360/53 |
| 6,272,606 | B1 | 8/2001 | Dorricott et al. | |
| 6,304,948 | B1 | 10/2001 | Motoyama et al. | |
| 6,675,176 | B1 * | 1/2004 | Shinkai et al. .............. | 707/200 |
| 6,801,992 | B2 | 10/2004 | Gajjar et al. | |
| 7,032,154 | B2 * | 4/2006 | Kidorf et al. ................. | 714/755 |
| 7,313,749 | B2 * | 12/2007 | Nerl et al. .................... | 714/764 |
| 2001/0039576 | A1 | 11/2001 | Kanada | |
| 2002/0174295 | A1 | 11/2002 | Ulrich et al. | |
| 2003/0115204 | A1 | 6/2003 | Greenblatt et al. | |
| 2003/0145270 | A1 | 7/2003 | Holt | |
| 2003/0237019 | A1 * | 12/2003 | Kleiman et al. ................ | 714/6 |
| 2004/0078746 | A1 * | 4/2004 | Tanaka et al. ................ | 714/758 |
| 2004/0163009 | A1 | 8/2004 | Goldstein et al. | |
| 2004/0205206 | A1 | 10/2004 | Naik et al. | |
| 2004/0243699 | A1 | 12/2004 | Koclanes et al. | |
| 2004/0250249 | A1 | 12/2004 | Fukunari et al. | |
| 2004/0267916 | A1 | 12/2004 | Chambliss et al. | |
| 2005/0278394 | A1 * | 12/2005 | Oks et al. .................... | 707/202 |
| 2008/0065933 | A1 * | 3/2008 | Thayer ........................ | 714/42 |

\* cited by examiner

*Primary Examiner*—Bryce P Bonzo
(74) *Attorney, Agent, or Firm*—Brooks Kushman P.C.

(57) ABSTRACT

A virtual data storage system includes a device emulator and a storage system for storing data to a plurality of physical devices in accordance with storage management policies. The data received by the device emulator is converted into a data object. The data object and object specific metadata are stored to storage media in accordance with the storage management policies. The object specific metadata is stored separate from the data object. In addition, the object specific metadata is embedded into the data object. Upon detecting an error when attempting to access the data object, an extent of data loss is determined by examining the object specific metadata.

14 Claims, 17 Drawing Sheets

AUTOMATED REPAIR OF DAMAGED OBJECTS

BACKGROUND OF THE INVENTION

1. Field of the Invention

The invention relates to intelligent data storage systems. The invention further relates to scheduling systems that provide intelligent data storage systems with the ability to perform actions on a scheduled or event driven basis.

2. Background Art

An intelligent data storage system needs the ability to perform actions on a scheduled or event driven basis. Sequencing of related activities must be enforced. Error monitoring and recovery must be performed. Activities must sometimes be performed on a periodic basis and sometimes be performed just once. Information must be available about past, present, and future activities.

In addition, a scheme for prioritization of activities must be provided. An activity must be interruptible so that a higher priority activity can be run.

Further, resources must be managed. Activities must be able to reserve resources, and activities must only be started when adequate resources are available.

While there are numerous existing scheduling systems, ranging from something as simple as UNIX cron to commercial systems, such as JES3, these systems do not provide the combination of activity scheduling, sequencing, monitoring, and error recovery needed to provide an autonomous storage system.

Background information may be found in U.S. Pat. Nos. 5,504,858; 6,272,606; 6,304,948; 6,675,176; and 6,801,992; and in U.S. Patent Application Publication Nos. 2001/0039576 A1, 2002/0174295 A1, 2003/0115204 A1, 2003/0145270 A1, 2003/0237019 A1, 2004/0163009 A1, 2004/0205206 A1, 2004/0243699 A1, 2004/0250249 A1, and 2004/0267916 A1.

SUMMARY OF THE INVENTION

It is an object of the invention to provide an improved automated activity scheduler.

The invention comprehends an automated activity scheduler that manages a set of pending, running, and completed activities. Activities are created by external processes that make use of the scheduler services.

In one aspect of the invention, activities can be specified to execute immediately or at a specified time in the future. In another aspect of the invention, activities can be sequenced through the use of dependencies between activities. Only when predecessors have completed successfully can the successors run.

In a preferred implementation of the invention, two running processes are used in performing the automated processing. One process is the scheduler process, and the other process is the activity monitor. The scheduler runs continuously. Every few seconds, it examines the list of to-be-run activities. For each activity that has now reached its scheduled time, the predecessors are checked. If all predecessors are determined to be successfully completed, the activity can be considered for starting. Next, a check is made to see if resources are available. If resources are available, the activity is started. Since the scheduler is intended to run in a multi-machine or multi-node environment, part of the resource reservation process is to determine which node to run on.

Once an activity is started on the selected node, the activity monitor begins monitoring the activity. The activity monitor also runs continuously and checks each activity that is supposed to be running. If an activity is found to be failed (i.e., the activity has crashed), or if the activity is found to be stuck, the activity monitor will take action. If the activity is running, but not making progress, the activity monitor will terminate the activity. Once the activity is killed, or if it is found to have crashed, a recovery process is performed. Then, the activity is returned to the list of to-be-run activities.

The scheduler and activity monitor are implemented in the preferred embodiment as a set of JAVA code. The scheduler defines a JAVA interface, which is a set of methods to be implemented by an activity. Applications that use the scheduler must define an implementation of the JAVA interface for each activity. In the preferred embodiment, the automated activity scheduler is used to implement storage management policies.

DETAILED DESCRIPTION OF THE PREFERRED EMBODIMENTS

Figure 1:
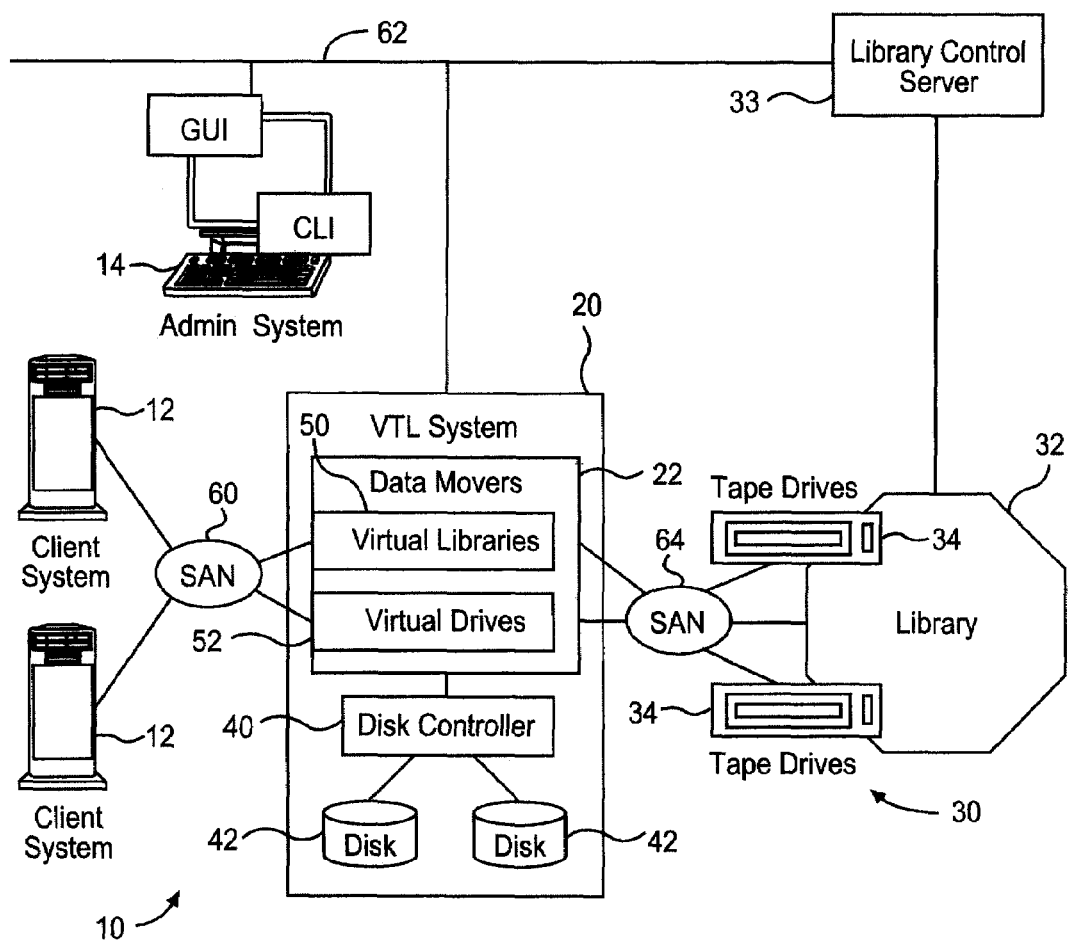
FIG. 1 illustrates an external view of a virtual data storage system made in accordance with the preferred embodiment of the invention.
Figure 2:
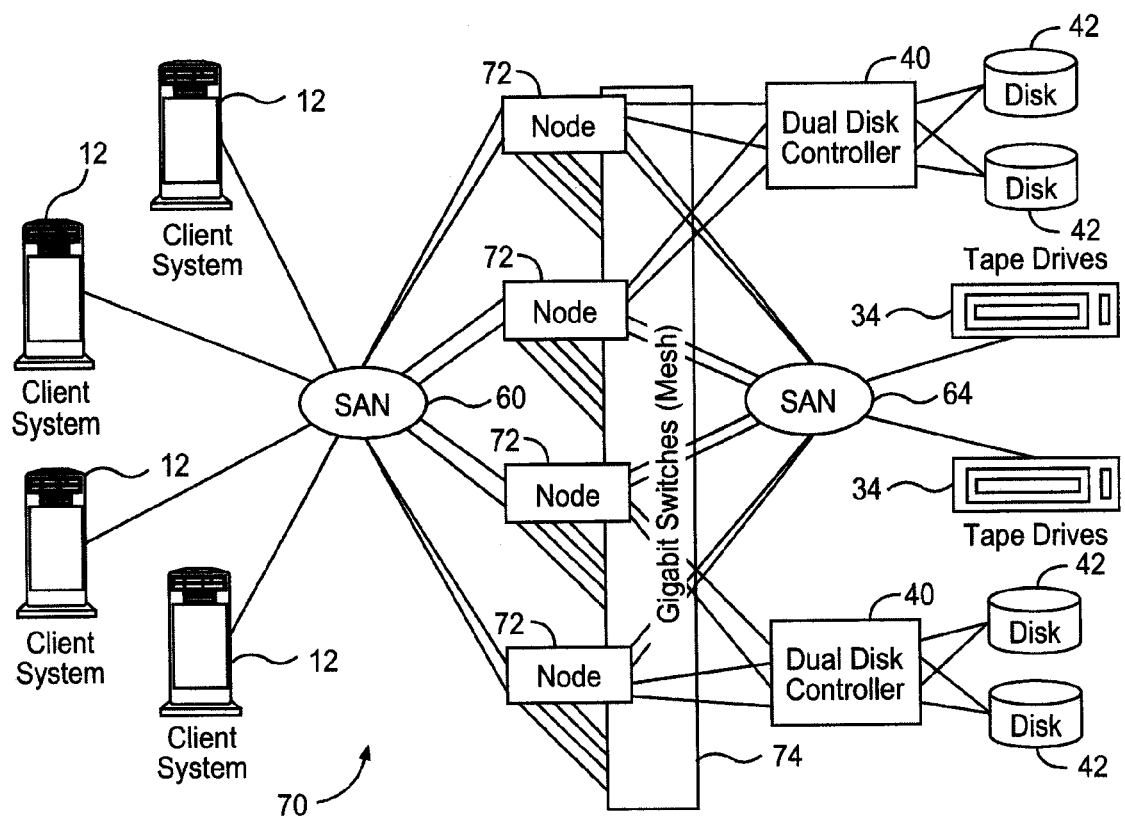
FIG. 2 illustrates system hardware in the preferred embodiment.
Figure 3:
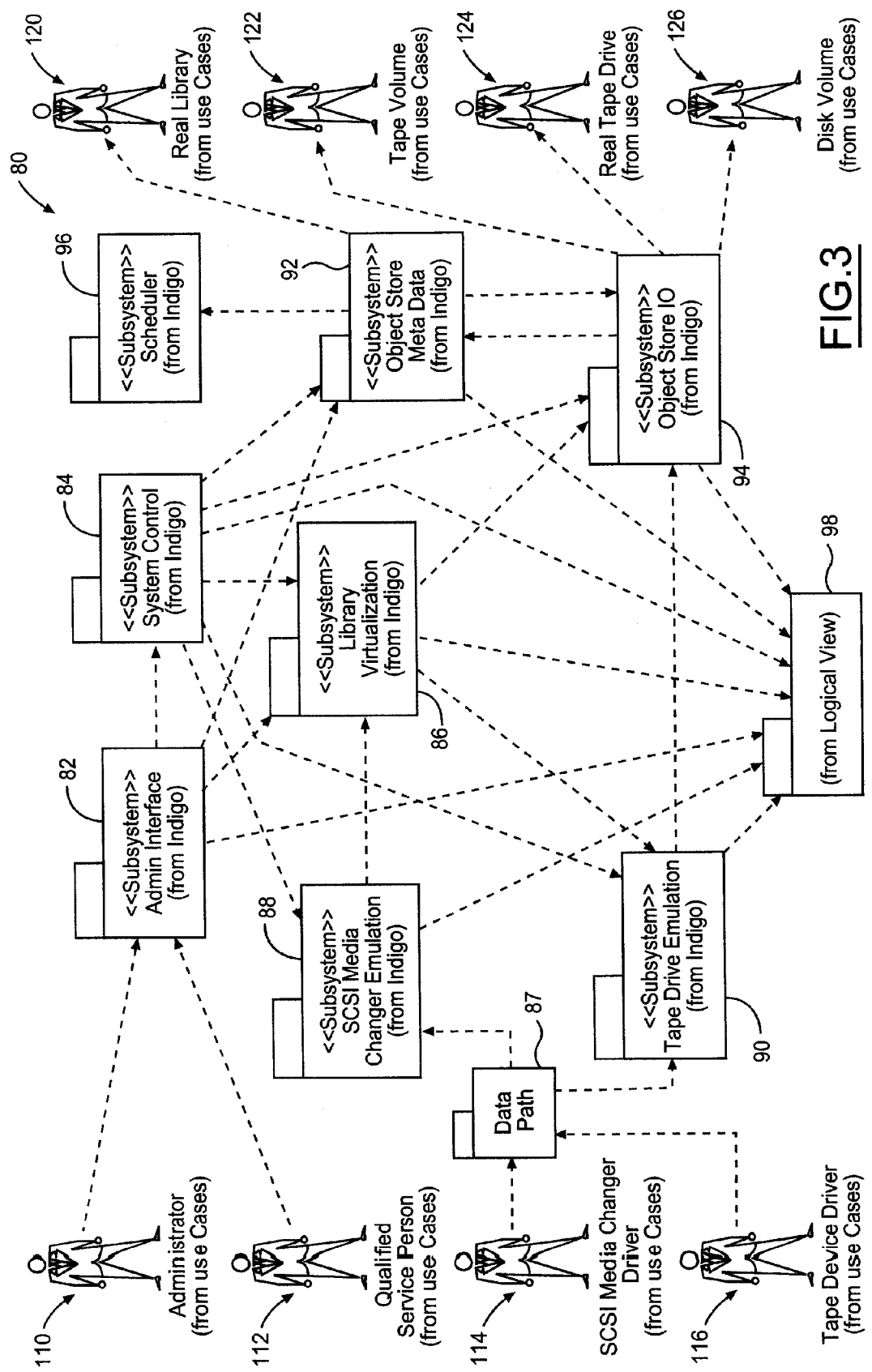
FIG. 3 illustrates system software subsystems in the preferred embodiment.

FIGS. 1-3 illustrate the preferred embodiment of the virtual data storage system. Further, it is appreciated that all aspects of the virtual data storage system presented in the drawings are part of the preferred embodiment of the invention. As such, other implementations are possible for implementing any one or more of the concepts involved in the invention. In FIG. 1, an external (user) view of the virtual data storage system is generally indicated at 10. The virtual data storage system involves two sets of computers which may be general purpose computers. The first set of computers are the client systems 12 and are outside the data storage system 20. The second set of computers are those inside the data storage system 20, which function as nodes or data movers 22, and are where the software runs. Software on client systems 12 may be limited to a command line or a graphical user interface. Back-end storage is generally indicated at 30 and is composed of library 32 and tape drives 34.

System 20 separates storage management aspects from data storage aspects. Client systems 12 are connected to virtual storage system 20 and view the system as a set of small computer systems interface (SCSI) media changer tape libraries 50 and tape drives 52. Client systems 12 connect to virtual storage system 20 over fibre channel storage area network (SAN) 60.

One of the client systems is administration system 14. Administration system 14 connects to system 20 over a transmission control protocol/Internet protocol (TCP/IP) local area network (LAN) connection 62. TCP/IP connection 62 is used for control functions. The tape drives 34 are connected to system 20 over a fibre channel storage area network (SAN) 64. The back-end real library 32 may be connected to system 20 over a fibre channel storage area network SAN 64 or may be connected over a TCP/IP network via a library controller server 33.

Virtual data storage system 20 provides a buffer or cache between client systems 12 and back-end storage 30 via disk controller 40 and disks 42. This improves cartridge utilization and throughput in back-end tape storage system 30.

FIG. 2 illustrates the hardware implementation in the preferred embodiment, at 70, which includes data movers in the form of nodes 72. Mesh network arrangement 74 interconnects the plurality of nodes 72. Mesh network arrangement 74 allows for the addition of further nodes 72 to facilitate increasing the capacity of the virtual data storage system.

FIG. 3 illustrates the software subsystems in the preferred embodiment of the invention, at 80. The administrative interface 82 provides the functions available to the administrator 110 or qualified service person 112. Both a Graphical User Interface (GUI) and a Command Line Interface (CLI) are provided. All human interaction with the virtual storage system is performed via the Admin Interface. The system control subsystem 84 controls the virtual storage system during startup, shutdown, and failover recovery operations. The library virtualization subsystem 86 maintains the information about the virtual libraries, virtual drives, and virtual tape volumes. This information is maintained in a persistent database. The data path subsystem 87 receives incoming SCSI over FC commands from the fiber channel hardware and routes them to the proper emulation subsystem. The SCSI media changer emulation subsystem 88 provides the virtual SCSI media changer devices for driver 114. The tape drive emulation subsystem 90 provides the virtual tape drives for driver 116. The object store meta-data subsystem 92 maintains information about the physical storage used by the virtual storage system to store customer data (VTVs) in real library 120. The object store IO subsystem 94 provides routines for reading and writing stored objects in tape volume 122, real tape drive 124 and/or disk volume 126. The scheduler 96 performs background system activities on a scheduled basis. The common platform subsystem 98 represents the Common Platform (CP) components used by the system. Each of these subsystems in the preferred embodiment of the invention is described in detail in the following sections.

Common Patterns

Several common design patterns are used throughout the virtual storage system. These are described once here.

Command Pattern

The command pattern is used when a number of different actions need to be performed, but the code performing the actions does not care about the details. An abstract superclass is defined for performing an arbitrary command. Subclasses are created for the specific commands that are to be performed. The code that performs the commands works with both the superclass and the subclasses. The results returned by the command may also be abstracted.

In the command pattern, an abstract superclass, Command, is defined. Typically, this has only one method, "execute," which is called with a list of parameters. This method typically returns a Result superclass. The Result superclass has methods that create the appropriate output from the Result object's contents. In the virtual storage system, the Results class may define methods to send the actual result to standard out, or convert the results into a CP message.

A number of different subclasses are defined for the Command class. One class will be created for each distinct command to be performed. Multiple subclasses of the Results class may also be created. Often, however, one Results subclass will suffice for several different Command subclasses.

Each Command subclass's execute method is programmed to perform the proper actions, and to place any outputs into a Results class or subclass object. Adding additional commands is simply a matter of adding Command subclasses.

The caller of the Command subclasses acquires a list of input parameters from an external source. In the virtual storage system, this source may be a parser, an XML document, or an interprocess message. The Command subclasses are named so that the caller extracts a key parameter from the list of parameters (such as a command name), and uses JAVA reflection to determine the proper subclass. Reflection is then used to create an object of this class, and to call its execute method. The returned Results object is used to create the necessary outputs.

Composite Value Pattern

The composite value pattern is used extensively for the results returned by many of the virtual storage system's inquiry functions. The composite pattern allows a hierarchy of objects to be constructed. Because many of the entities managed in the virtual storage system are arranged in a hierarchy, this pattern can hold any of the various items returned from the inquiry functions.

Figure 4:
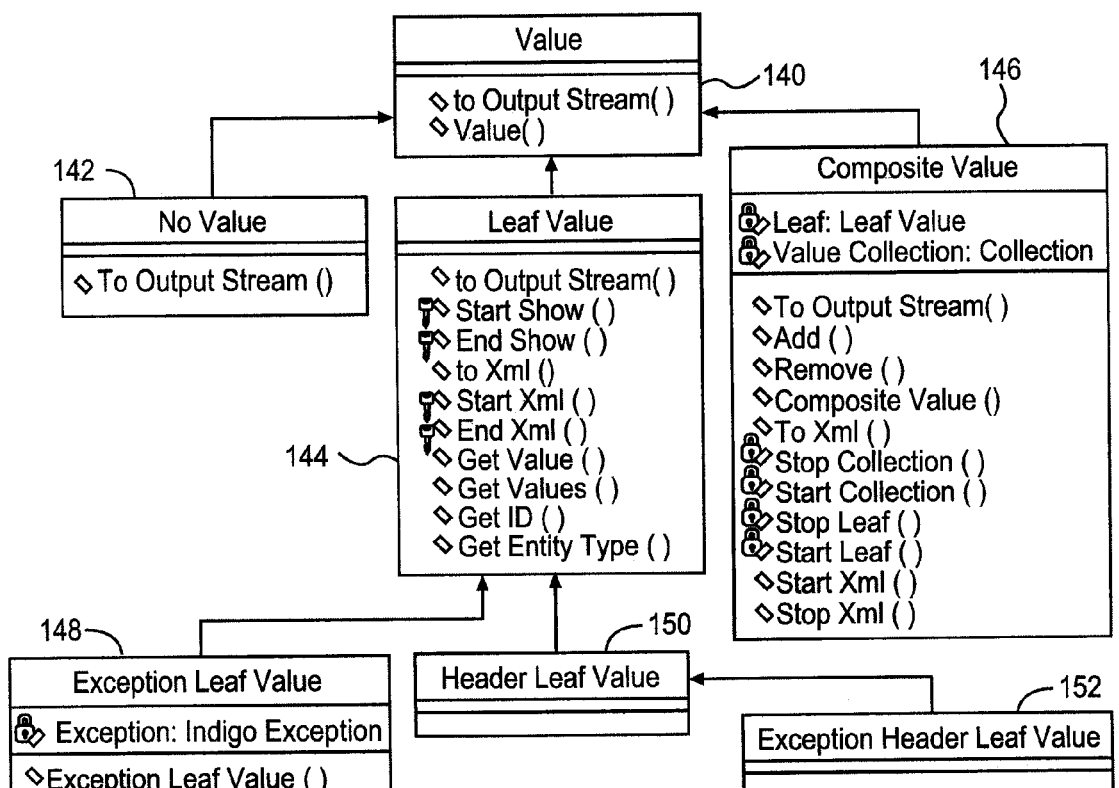
FIG. 4 illustrates the structure of the composite value classes.

A diagram of the composite value pattern is shown in FIG. 4. As shown, the composite value pattern involves a number of related classes 140, 142, 146, 148, 150, and 152.

Many subclasses of the LeafValue class are created, one for each of the various structures to be returned. The inquiry functions construct a hierarchy of CompositeValue objects, with the CompositeValue's "leaf" and "collection" attributes filled in with other CompositeValues or LeafValue subclass objects. Methods such as "toXML" and "toOutputStream" can be used on the root of the hierarchy to produce an output of the entire hierarchy.

Listener Pattern

The listener pattern is used when actions must be performed in response to an external stimulus. The listener pattern consists of an always-running Listener process and a Handler process or thread that is spawned on demand. The Listener process is normally started when the system starts up. External processes send messages to the listener using a well-known destination. When a message is received, the Listener spawns a new Handler process or thread to perform the necessary action.

The Listener spawns a JAVA thread for the Handler. The Handler performs some action, and sends back a result also using message passing.

The message passing mechanism is quite flexible, and can operate across nodes and between kernel and user space. A Listener that uses message passing is used in several places in the virtual storage system to perform method calls transparently across nodes and between user and kernel space. This "extended listener" pattern starts with a set of methods or functions. These functions convert their arguments into a message, and send the message to a listener. The listener spawns a handler and gives it the message. The handler converts the message to a list of arguments. The handler then uses the command pattern to execute the command specified in the list of arguments. This returns a results object, which is converted into a second message. This message is sent back to the waiting function call. The function call converts the returned message into its outputs and returns these outputs to its caller.

Controller, Value Object, Domain Object Pattern

Several subsystems encapsulate significant behavior and persistent storage of information. Inside the subsystem, a set of JAVA classes called "domain objects" perform the behaviors, save themselves into an underlying database, and retrieve themselves from the database. Because using these objects directly is often complex, a set of simpler-to-use methods is provided by a controller class. The controller class provides an externally usable interface to the underlying behaviors and persistence provided inside the subsystems. There are also many situations where information about the objects inside the subsystem is needed externally. To meet this need, a set of "value objects" are provided. These value objects provide snapshots of the corresponding domain objects. Value objects can safely be used outside the subsystem because they do not expose the behaviors provided in the domain objects.

This pattern is an example of the model, view, controller design pattern. The domain objects are the model and the value objects are the view. The controller classes are the controller part of the pattern.

Underneath the domain objects there are typically an additional set of classes called the DAO classes. These "Data Access Objects" are used to interact with the underlying database. These classes use an open source tool called CASTOR, in combination with JDBC (JAVA DB connect) to access the SQL database.

The domain objects are typically representational. That is, rather than being the actual object, they are merely representations of the object. For example, a "node" domain object is not the actual hardware node. Rather, it just represents the hardware node in the application. The node domain object may well interact with the actual hardware node. Other examples are less concrete. A VTD domain object represents the actual VTD. The actual VTD is the set of kernel level code to provide the VTD emulation. Similarly, a VTV domain object represents the VTV, while the actual VTV is the data stored somewhere inside the virtual storage system.

Admin Interface Subsystem

The Administrative Interface subsystem 82 provides the mechanism for an external administrator 110 to perform configuration actions on the virtual storage system as well as to receive reports about the virtual storage system. Two interfaces are provided: a browser based GUI (Graphical User Interface) and a CLI (Command Line Interface). All functions can be performed with any interface, although GUI functionality may lag the CLI interface.

The CLI requires a software component be installed at a client system. This software component provides the client side CLI commands that are run to control the virtual storage system. The CLI uses an XML based protocol to interact with the virtual storage system. The GUI works within a web browser. So, no additional software is required on a client machine to use the GUI. Both the GUI and the CLI require network access to the virtual storage system.

The function of the AI subsystem 82 is to transport the command from the client computer to the virtual storage system, invoke methods in the underlying virtual storage system to perform the requested action, and return the results.

Figure 5:
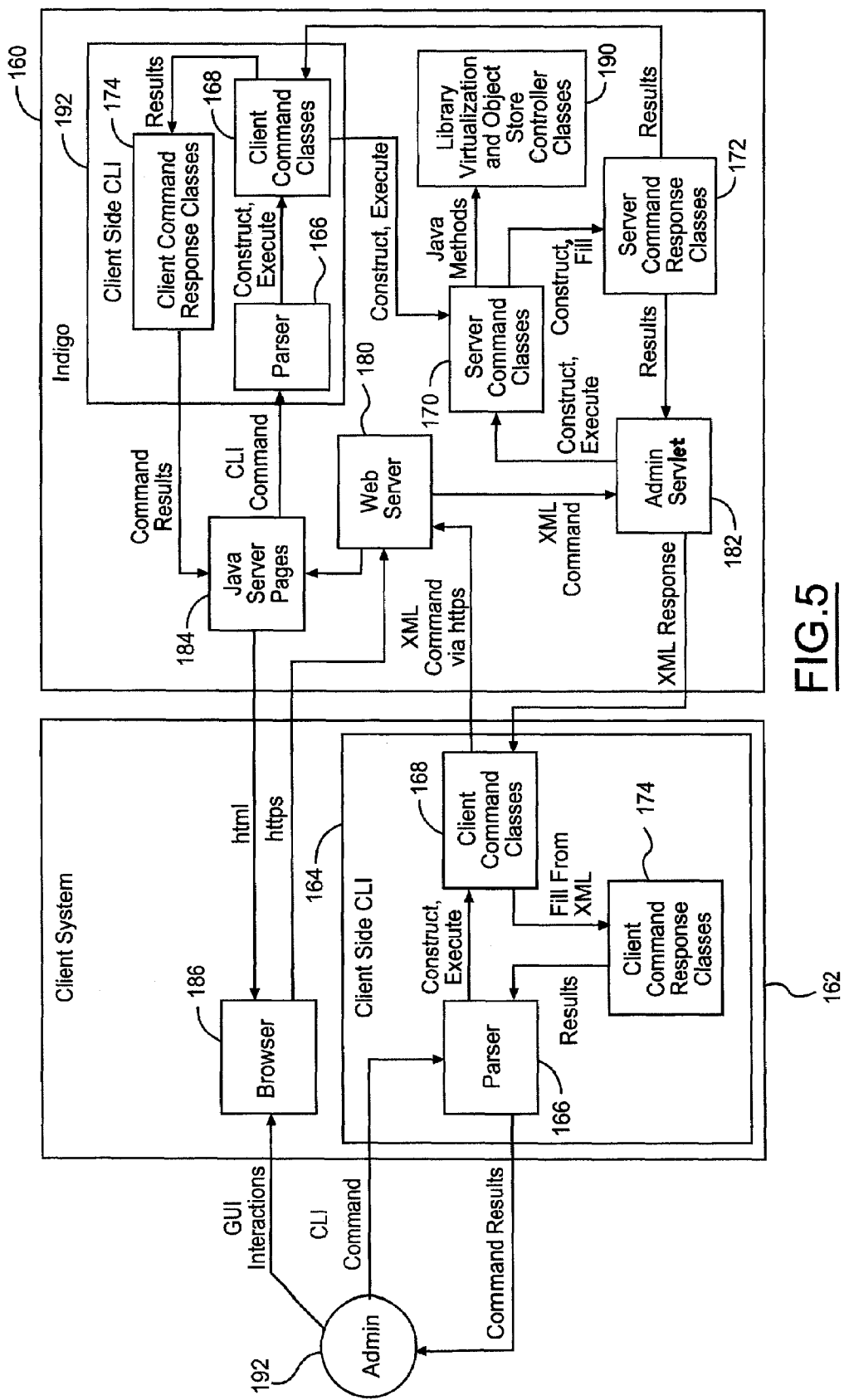
FIG. 5 illustrates the CLI command processing sequence.

The structure of this subsystem is shown in FIG. 5. Each box represents a package. A package consists of one or more Java classes.

All interactions with the virtual storage system 160 occur from a location outside the virtual storage system 160. Customer administrators will not "log on" the virtual storage system 160 itself. Interactions always occur through the web server 180 using the secure https protocol.

The CLI has a software component 164 that is installed on the administrator server 162. This component 164 consists of a parser 166 that reads and interprets the CLI commands entered by the administrator 192. Syntax errors and missing parameters are detected by the parser 166. The command pattern is used twice in the CLI subsystem. One instance 168 of the command class is used on the client host, while the second set 170 is used on the virtual storage system 160. The client side commands construct an XML document from the parameter list produced by the parser 166. This list is sent to the storage system web server 180. The web server 180 uses a servlet 182 to convert the XML document back to a parameter list, and uses the second instance 170 of the design pattern to execute the command. The command subclasses use controller methods 190 to perform the desired actions. On the way back, the results are converted to XML on the storage system side, transmitted back to the client side, then converted back to a results object. This is depicted by server command response classes 172 and client command response classes 174. The results object is then used to print any results from the command.

The browser based GUI is started by entering the url of the storage system into the browser 186. This brings up the log-on screen of the storage system 160. Once a user id and password are successfully entered, the storage system GUI appears. From here, the administrator 192 can perform the various interactions with the storage system 160. The storage system web server 180 uses a series of JSPs 184 (JAVA server pages) to dynamically create the necessary html documents to provide the proper appearance to the administrator 192. These JSPs 184 consist of a combination of html text with embedded JAVA method invocations to dynamically construct the full html page. The JAVA method invocations use the CLI 192 (on the storage system itself, rather than a client system) to perform commands against the storage system 160. The results of these commands are used to construct the final html pages.

If the GUI or CLI encounters a timeout while interacting with the with the web server 180, the command is retried. The storage system 160 must ensure that the same command is not performed twice if the first command is in fact in progress. The web server 180 is controlled by the storage system failover process, so a hardware or software failure should produce only a short outage. The system also needs to provide a way to ensure that the XML documents are sent in their entirety, if this is not intrinsically supported by the https protocol.

It is also possible to run the system CLI directly on the storage system 160 without the web server 180 being running. This is done by using a direct connection (i.e., method invocations) between the two instances of the command pattern. This is used by the GUI, and can be used if needed by a service person.

System Control

The system control subsystem 84 provides several different functions that are all related to the control of the system as a whole. These functions include startup and shutdown, crash recovery, failover, and responding to CP configuration changes.

Library Virtualization Subsystem

The library virtualization subsystem 86 retains the knowledge about the virtual objects present in the virtual storage system. These objects include VACS class (virtual library), VTD class (virtual tape drive), VTV class (virtual tape volume), and related statistics. The LVS subsystem 86 maintains information about the allowed types of VACSes, VTDs, and VTVs that can be created, and the characteristics of each type. LVS enforces any limitations dictated by the type, such as the number of cells in a VACS or the compatibility between VTV types and VTD types. A variety of VACS, VTD, and VTV types are supported, and more types could be added.

All changes to VACSes, VTDs, and VTVs are done with the LVS subsystem 86. This is true whether the change is made by an administrator or by a virtual control interface such as the SCSI media changer. The LVS subsystem 86 may interact with the tape drive emulation subsystem 90 to manipulate the underlying VTD, and with the object store meta-data subsystem 92 to manipulate the underlying stored object for a VTV. Information about VACes is kept just in the LVS subsystem 86.

The library virtualization subsystem (LVS) 86 uses the controller/value objects/domain objects pattern. The persistent information about the LVS objects is stored in the library virtualization database. Domain objects and DAO objects are defined and used within the subsystem.

An LVSController class, and a series of value object classes, are exported by this subsystem. The LVSController is used by the admin interface subsystem 82.

The library virtualization subsystem 86 also provides an interface for use by the SCSI media change emulation subsystem 88. This is the SCSICMController class. This class uses the same value object classes as the LVSController.

Data Path Subsystem

The data path subsystem 87 receives the SCSI over fibre channel commands sent by the SCSI media changer driver 114 and tape drive driver 116 across the fiber channel SAN hardware. Data path subsystem 87 assembles the FC frames from the physical hardware into SCSI level commands. These commands are in turn routed to a subsystem for interpreting and processing the commands. In the virtual tape library system, these emulations are the SCSI media changer subsystem 88 and tape drive emulation subsystem 90.

SCSI Media Changer Emulation Subsystem

This subsystem 88 performs the function of emulating SCSI Media changer devices. It sits behind the data path subsystem to receive SCSI (over Fibre Channel) requests for SCSI media changer (a/k/a medium changer) devices. Requests are handled by interacting with the library virtualization subsystem 86 to produce the proper response. This subsystem 88 is mostly JAVA code executing in user space. A small C kernel level module is used in the SCSI media changer emulator package to provide the device level interface.

The SCSI media changer emulation subsystem 88 uses the "extended listener" pattern described previously. The module that is called by the kernel module is the SCSIMediaChangerEmulator. This is the caller in the pattern. Messages are sent to the IndigoListener, which spawns IndigoHandler threads. These then use the command pattern to perform the requested command. A command subclass is defined for each SCSI media changer command. These subclasses use the SCSIMCController provided by LVS to perform the requested action.

Tape Drive Emulation Subsystem

The tape drive emulation subsystem 90 provides the mechanisms for emulating tape drive devices. The tape drive emulation subsystem 90 consists of both C and Java code. Most of the C code in this subsystem 90 takes the form of kernel loadable modules. These modules perform the data transfer operations. A few Java classes are provided as interfaces to be used by library virtualization to control the operation of this subsystem 90.

Object Store

The object store subsystem provides for the physical storage of arbitrary objects. Within the virtual storage system, the object store subsystem is used to store the VTVs. The object store consists of two subsystems: Object Store Metadata 92 and Object Store IO 94. The Object Store Metadata subsystem 92 retains all information about the stored objects, and performs the management of the stored objects. Object Store IO 94 provides IO interfaces to read and write stored objects.

The object store provides the ability to store objects on both disk and tape, to automatically move or copy objects between different storage media, and to delete objects according to policies.

Object Store IO Subsystem

The object IO subsystem 94 performs the IO operations on objects. It supports using disk or tape for physical storage. This subsystem also spans across nodes to allow IO operations from one node to access storage on another node. It consists of three major packages, Object IO (the actual IO routines), Object Copier (makes copies of objects, driven by policy engine), and the Kernel DB IF (keeps object store meta-data database in sync with actual data.)

Object Store Metadata Subsystem

The object store metadata subsystem 92 manages the information about the stored objects and physical storage. It maintains the persistent meta-data about the stored objects and the physical storage.

The object store metadata subsystem 92 retains the knowledge about the entities used to manage stored objects present in the storage system. There are a large number of objects involved. They generally fall into several categories:

1. Stored objects—Includes the stored objects, streams, replicas, and segments.

2. Physical storage—Includes real tape drives (RTDs), real tape volumes (RTVs), tape libraries, and disk volumes. Also includes information about the utilization (contents) of RTVs and disk volumes.

3. Storage management policies—Includes the storage pools (groups of RTVs and disk volumes) and the policies that dictate how the pools are used.

4. Storage management activities—Includes the background activities performed automatically by the system to enforce the storage management policies. This information includes detailed information about the data movements made by I/O activities.

All changes to these objects are done with the object store metadata subsystem 92. This is true whether the change is made by an administrator or by a programmatic interface. The object store metadata subsystem 92 may interact with the object store IO subsystem 94 to manipulate the underlying storage for the stored object for a VTV.

The object store metadata subsystem (OSM) 92 uses the controller/value objects/domain objects pattern. The persistent information about the OSMS objects is stored in the object store database. Domain objects and DAO objects are defined and used within the subsystem.

A OSSController class, and a series of value object classes, are exported by this subsystem. The OSSController is used by the admin interface subsystem.

The object store metadata subsystem 92 also provides an interface for use by the object store IO subsystem 94. This is the OSDBIFController class. This class uses the same value object classes as the OSSController. It is called by the Kernel DB IF routines.

The object store metadata subsystem 92 also has two active processes which run all the time. These are the scheduler and the activity monitor. The scheduler manages the queues of activities and starts activities as appropriate.

Scheduler Subsystem (Overview)

The various background activities necessary to enforce the virtual storage system policies are managed by the scheduler 96. The scheduler 96 is an active component. The virtual storage system activities represent the future, current, and past work done automatically by the virtual storage system.

The scheduler maintains a list of future, current, and past activities that are created as the system runs. As VTVs are mounted, activities are created to enforce the storage management policies that apply to the VTV. As storage space is consumed or freed, activities may be created to enforce the storage pool policies for the affected pools. When the system starts, activities may be created to correct errors that are detected during startup.

As the system runs, the scheduler monitors the pending and running activities. As the scheduled start time arrives for a pending activity, the scheduler will attempt to start the activity. The scheduler will start the activity as soon as the necessary resources are available. The scheduler will also monitor running activities. Activities that fail will be restarted.

The scheduler understands dependencies between activities. An activity that is a successor to another activity cannot be run until the predecessor has completed successfully.

Activities can run for a long time, up to many hours. In the event that the system or some of its components must be shutdown, it may be necessary to interrupt these long-running processes. The scheduler provides the means for temporarily suspending an activity, then restarting it at a later time.

Any subsystem may define activities. To define an Activity, a class must be created that implements the ActivityInterface defined by the Scheduler subsystem. This interface defines a set of methods that the scheduler uses to execute, monitor, and manage the activity.

The LVS subsystem 86 defines activities to repair mounted VTVs after a system or component crash, to dump information about VTV mounts for external analysis, and to remove old mount information from the database.

The Scheduler subsystem 96 defines activities to dump information about old activities for external analysis, and to remove old information from the database.

The OSM subsystem 92 defines a number of activities. These include activities to perform the actions to enforce storage management policies and storage pool policies. Activities are also defined to perform diagnostics and auditing of disk and tape volumes. These are used during system startup and after a component failure. Activities are also defined to initialize new disk volumes, and to mount disk volumes on a specific node. As for the other subsystems, OSM defines activities to dump activity information for external analysis and to delete old information.

The persistence (DB) utility package defines an activity to backup the virtual storage system database.

Infrastructure Components

The Infrastructure Package is a set of small packages that provide utility functions for the rest of the virtual storage system. These components are too small to be considered true subsystems, but do provide functions used throughout the system.

Figure 6:
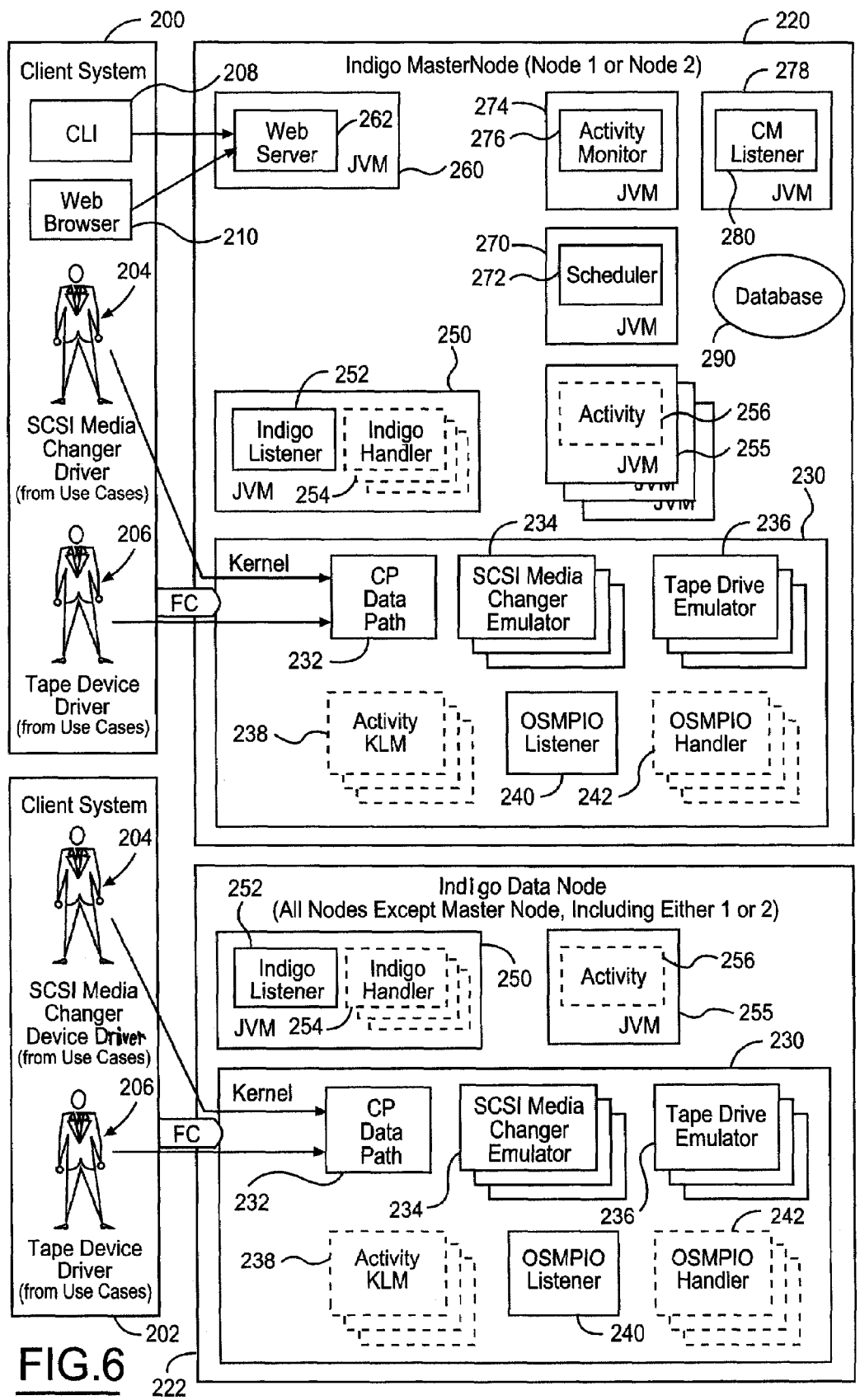
FIG. 6 illustrates the deployment of processes to hardware.

FIG. 6 illustrates the deployment of processes to hardware, and illustrates the way that the preferred embodiment of the invention offers improved scalability. As mentioned previously, only the CLI exists on the client systems. The remaining software runs on the nodes. In the preferred embodiment there are two types of nodes: control nodes and data nodes. Control nodes support all of the functionality, while data nodes support only the components related to data transfer. At least one control node is required. Two are required to provide redundancy. In one suitable implementation, for systems with more than two nodes, the nodes may be identical, but only the first two nodes are control nodes. The remaining nodes are data nodes.

In FIG. 6, client systems are indicated at 200 and 202. Each client system includes SCSI media changer device driver 204 and tape device driver 206. Client system 200 further includes CLI 208 and web browser 210. A master node is indicated at 220, while a data node is indicated at 222.

For each node, the kernel is indicated at 230 and several kernel components are specifically illustrated. In more detail, kernel 230 includes data path subsystem 232, SCSI media changer emulators 234, tape drive emulators 236, activity KLM 238, OSMPIO listener 240, and OSMPIO handlers 242. Further, each node includes JVM 250 containing system listener 252 and handlers 254. Also illustrated for each node is JVM 255 containing activity 256.

Master node 220 includes a number of additional processes. As shown, JVM 260 contains web server 262. Further, JVM 270 contains scheduler 272. JVM 274 includes activity monitor 276. JVM 278 contains CM listener 280. Finally, the database is indicated at 290.

In operation, in the preferred embodiment, the invention involves a transactional model. As the system operates, it performs transactions. Some transactions may be very quick, such as creating a new virtual library. Other transactions may take more time, such as writing a virtual tape volume.

As depicted in FIG. 6, there are several long running processes. These processes do not generally keep information about the system in memory. All information that is necessary for continued system operation is written to persistent storage. All updates to persistent storage are done so that information is always consistent, if possible. In cases where full consistency is not possible, the persistent storage is updated in such a way that consistency can be restored reliably after a system crash. This situation occurs when user data is being written to disk or tape.

Most of the long running processes spawn other short-lived processes or threads to perform the actual work. As best shown in FIG. 6, long running processes are usually listeners, which wait for specific events to occur, or monitors, which watch for specific events to occur. In either case, a long running process will spawn short-lived processes or threads to perform the necessary work to handle the event. Various handlers are illustrated in FIG. 6.

For example, web server 262 is a listener type process that listens for incoming command requests. Upon arrival of a request, a thread is created to process the request. Once the task is completed, the thread terminates.

For example, scheduler 272 is a monitor type of process. This process monitors the time, and performs various background activities at designated times.

In the preferred embodiment, the configuration data for the system is held in database 290, which is implemented as a structured query language (SQL) database. This data includes information about the virtual entities, physical entities, and activities performed by the system. Database 290 is the reference source of this information.

Accordingly, information is loaded into a running process only during the time needed to perform a transaction. Database locking is used to ensure that transactions are always atomic. The locking mechanism ensures that a transaction is never partially completed, leaving database 290 in an inconsistent state.

Longer running processes, such as reading or writing a virtual tape volume (VTV), or the process for copying a VTV from disk to tape, perform a number of database transactions as they run. Each transaction brings the database into synchronization with the physical storage. Once the database transaction is completed, input/output (I/O) to the physical storage continues.

In the event of a crash, database 290 is used as the definitive source of information about the system. The information in the database is used to reconcile the physical storage to a consistent state. This may result in the loss of data written to physical storage after the last database transaction. Internal system activities are configured to re-start from the most recent database transaction. Operations that are driven externally, specifically host I/O to a virtual data drive, must always update the database at points where the host expects a guarantee that data is actually stored.

The deployment of processes described above, in accordance with the preferred embodiment of the invention, makes it possible to utilize a mesh network arrangement to interconnect a plurality of nodes and to allow addition of further nodes to facilitate increasing a capacity of the virtual data storage system. Further, it is appreciated that other approaches to deployment of processes to hardware could also be used in alternative implementations of the invention.

Figure 7:
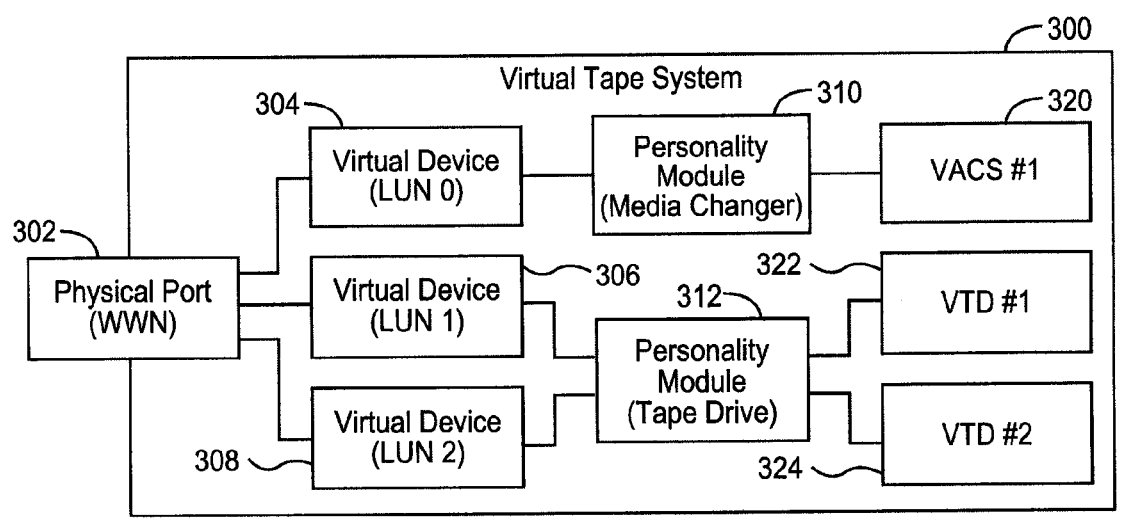
FIG. 7 illustrates dynamic device reconfiguration in accordance with a preferred embodiment of the invention.

In addition to the concepts of separating storage management aspects from device emulation aspects and improving scalability with the mesh network arrangement for interconnecting nodes or data movers, the invention also comprehends adding flexibility in the way that virtual drives appear to client systems. FIG. 7 illustrates dynamic device reconfiguration in a preferred embodiment of the invention. In accordance with this aspect of the invention, the virtual storage system must present various types of storage devices to attached hosts. These devices appear to the host as if they were real storage devices. These may include, for example, disk, tape, or library type devices. Unlike a real device, a storage virtualization system needs to be able to present different device types at different times. The storage virtualization system must accomplish this while at the same time remaining online and active for unaffected virtual devices.

In accordance with this aspect of the invention, the virtual storage system presents a variable set of virtual devices on each physical target (i.e., host-connected) port. A SCSI "report luns" command will always respond with the lun numbers of the currently configured set of virtual devices. As the system is running, a new virtual device can be created and assigned to a specific target port. The personality modules that provide the device emulation are associated to the virtual device as the virtual device is configured. Virtual devices can also be removed while the system is running. This provides the administrators with the ability to configure the virtual storage system without affecting other users of the storage system.

Assignment of a personality to the device will result in SCSI commands returning appropriate responses for the device type. The inquiry command will return data that correctly identifies the device type and the characteristics of the device. Other commands will be handled in a device type specific manner. A virtual tape drive, for example, will respond to read, write, and positioning commands. A virtual tape library will respond to move medium and read element status commands.

In a further aspect of the preferred implementation of this concept, the concept could be applied to existing real storage devices and could also be used in conjunction with appropriate host side software to create devices that have no real counterparts. In this way, a host driver could communicate with this special device to perform a function distinct from behavior of a real device.

FIG. 7 illustrates an exemplary implementation of the dynamic device reconfiguration concept, and a virtual tape system is indicated at 300.

As shown, physical port 302 is in communication with virtual device 304, virtual device 306, and virtual device 308. In the example, which uses Fibre Channel protocol, devices are identified by a combination of WWN (world wide name) and LUN (logical unit number). Nevertheless, the concept is not specific to this protocol, and can be applied to any storage protocol.

Physical port 302 may be used to present a series of virtual devices 304, 306 and 308. Each device has a unique logical unit number. The virtual devices can be dynamically created and associated with the port, or may be dynamically destroyed. Multiple personality modules 310, 312 can be used. In this example, two distinct modules 310, 312 are provided. Finally, specific devices can be associated with each virtual device and personality. In this example, two virtual tape drives (VTDs) 322, 324 are shown. While both share the same personality, they are distinct devices and can be manipulated independently by a host. The VACS is indicated at 320.

It is appreciated that the dynamic creation and destruction of virtual tape libraries and virtual tape drives may be utilized in various implementations of virtual data storage systems made in accordance with the invention.

Figure 8:
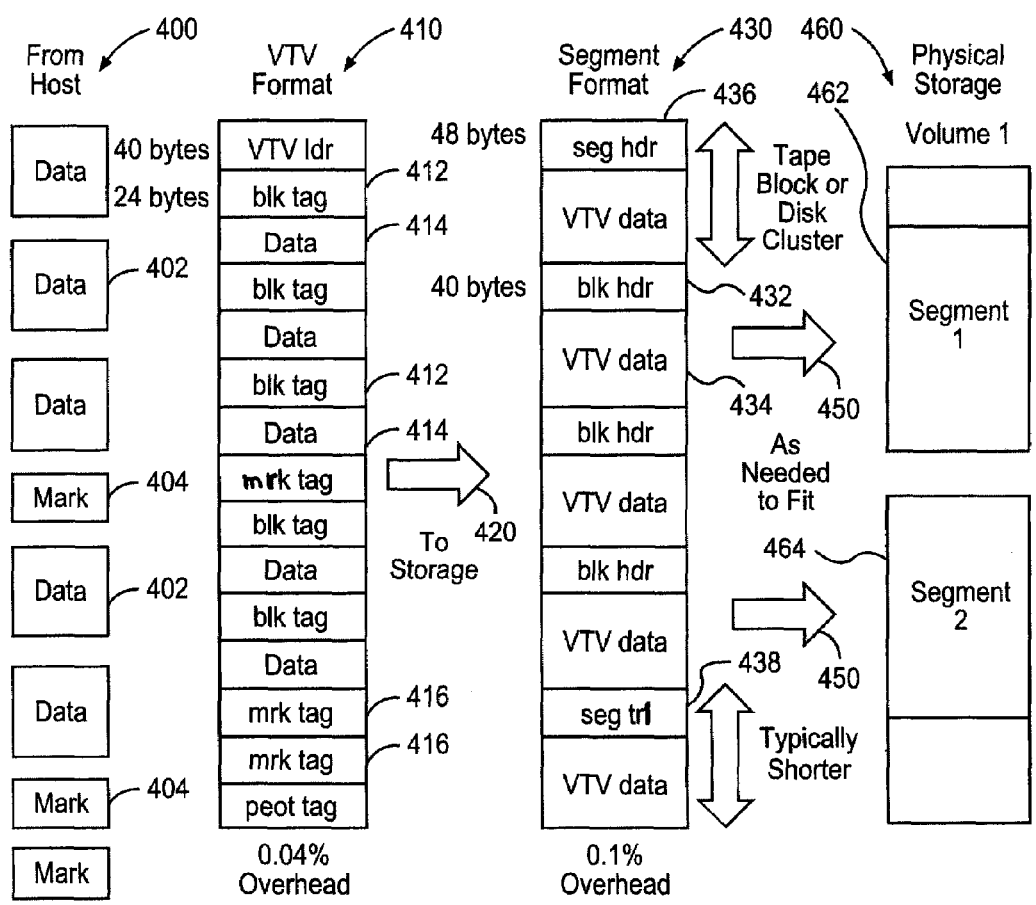
FIG. 8 illustrates the use of on media formats to ensure data integrity in the preferred embodiment.

FIG. 8 illustrates the use of on media formats to ensure data integrity in accordance with the preferred embodiment of the invention. This is a mechanism to synchronize the mapping information with the actual data. More specifically, object 10 subsystem 94 attempts to keep the object store metadata database in sync with actual data. Nevertheless, it could still be possible that certain events could cause the on media information to become out of sync with the mapping information.

An approach to address this issue, in accordance with the invention, involves inserting identification information into the data stream as the data stream is stored to physical storage. This identification information, or metadata, provides information about the virtual object that the data belongs to.

The preferred implementation of this concept is illustrated in FIG. 8 and uses a two stage approach to inserting the metadata into virtual objects: virtual and physical.

The reception of blocks from the host is indicated at 400. The information received from the host includes host data 402 and tape marks 404 written by the host. The host data is shown in the virtual tape volume format at 410. As shown, virtual block tags 412 are added to the original blocks 402 written by the host. More specifically, in the VTV format, each data block 414 is tagged by a corresponding block tag 412. Tape mark tags 416 indicate tape marks. Each block tag 412 identifies the virtual volume that the block belongs to, and the position of the block within the virtual volume. The resultant stream of bytes makes up the combination of the host data and the metadata.

Further, in this preferred implementation, when the VTV formatted data 410 is moved to physical storage (arrow 420), physical block headers 432 are inserted into the resulting data stream 434. More specifically, second header 432 is placed at the beginning of each physical block 434 as each block of data is written to physical storage. Each header 432 identifies the object that the associated block belongs to, the location of the block within the object, and the expected physical location of the block. When writing to physical storage, the data may be reorganized into blocks that are of an optimal size for the storage medium. The data is shown in a segment format at 430. The final column 460 in FIG. 8 shows how this byte stream may be placed (arrow 450) onto two different physical volumes 462 and 464.

In accordance with the invention, when it is necessary to update the mapping information that defines the physical location(s) of each virtual volume, in the preferred implementation, the two sets of block headers 412 and 432 can be read. This provides sufficient information to rebuild the mapping information. These headers 412 and 432 could also be used when an object is read to verify that the correct data is being returned.

In addition, other implementations are possible and implementations are not limited to any particular types of physical storage, or to any particular types of virtual objects.

Figure 9:
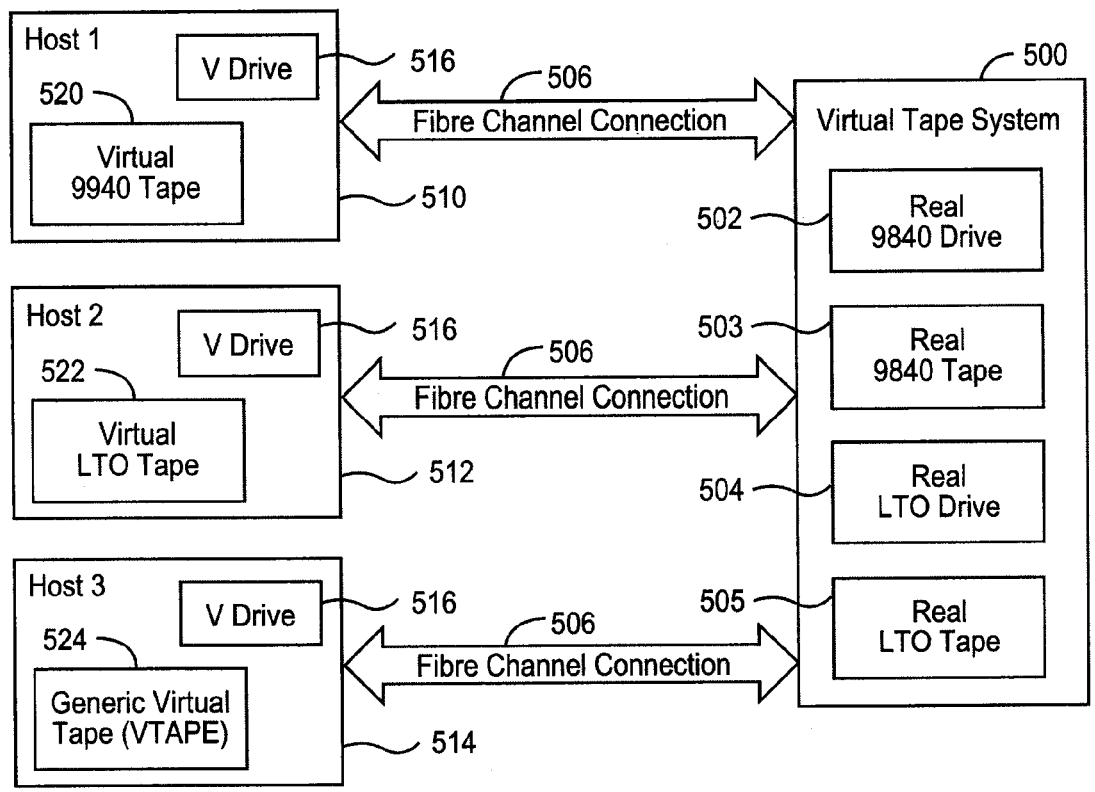
FIG. 9 illustrates the use of a universal virtual tape drive type in the preferred embodiment.

In addition to the many concepts already described, the invention also comprehends a universal virtual tape drive type. FIG. 9 illustrates the use of a universal virtual tape drive type in the preferred embodiment. Other implementations are possible.

Virtual tape system 500 includes real drives and tapes 502, 503, 504, and 505. Fiber channel connections 506 connect hosts 510, 512, and 514 to virtual tape system 500. In accordance with the capabilities of virtual tape system 500, each host 510, 512, and 514 is presented with a virtual tape drive 516. As multiple media types may be compatible with a drive type, various media 520, 522, and 524 are shown at the hosts 510, 512, and 514 as being accessible through the virtual drives 516.

The invention contemplates a universal virtual tape drive type. In the preferred implementation illustrated in FIG. 9, virtual drives 516, which are presented to the hosts, are universal virtual tape drives. Universal drives 516, are provided instead of, or in addition to, emulations of specific real tape drive types.

In the preferred embodiment, universal drives 516 have the same basic SCSI command set as any other virtual tape drive type. The basic command set is sufficient. This allows universal drives 516 to be used with many existing host applications with minimal changes.

Universal drives 516 provide wide compatibility with virtual cartridges as exemplified by various media 520, 522, and 524. In this way, virtual drives 516 can read or write any type of virtual media. This allows virtual media to be created that mimic media types the host applications already understand. These media types can already be present in the application's catalog. This allows virtual media to be created that match existing real media that already hold data known to the host application. The universal virtual tape drive type can now read and write any type of virtual media known to the host application.

As best shown in FIG. 9, a set of hosts 510, 512, and 514 can use the universal virtual tape drives. Each host may use a distinct media type 520, 522, and 524. It is appreciated that the media types used by the hosts are independent of the media types and drive types actually used in the virtual tape system 500.

Further, in the preferred embodiment, universal drives 516 allow applications to be decoupled from the physical tape technology (real media 502, 503, 504, and 505 in virtual tape system 500). That is, applications are decoupled from drive geometry. This allows a host application to be configured once because the universal virtual tape drives 516 present generic tape images regardless of physical tapes being used.

Another advantage of universal virtual tape drives 516 is that the avoidance of many different tape drives minimizes the time and effort needed to certify virtual tape systems, and minimizes host machine configurations. At this same time, the applications understand that multiple media types may be compatible with a drive type so the applications can use virtual media that mimic media types that the applications already understand.

In yet another advantage, the universal virtual tape drives comprehended by the invention could provide the capability to import real media containing data, convert it to virtual media, and move the data transparently to higher performance and higher capacity real tape.

The following description and FIGS. 10-16 describe the scheduler 96 (FIG. 3) at the more detailed level in its preferred implementation.

Scheduler Subsystem (Detailed Description)

The various background activities executed by a running system are managed by the scheduler subsystem. This subsystem contains a list of activities to be done and manages the initiation and monitoring of these activities. The scheduler itself is an active component that manages this list and initiates activities. Activities represent the future, current, and past work done automatically by the system. The scheduler runs periodically, and will attempt to start new activities each time it runs.

The terms "activity" and "process" are both used in this section (and others). The term "activity" refers to the system's record of something that is to be done, being done, or that has been done. When an activity is being done, a "process" is running that is actually doing the work. A process refers to one or more system processes that are running in the system. This process or processes will be running a system program to perform the necessary actions. These processes are started by the scheduler when it decides the activity can start. The scheduler (i.e., SchedulerProcess) runs on the system control node (a/k/a master node), and may start processes on any node. The term "program" refers to a stand-alone executable unit. This is distinct from a "thread" which may be created by a running process, but runs in the same execution context as the parent process.

Figure 10:
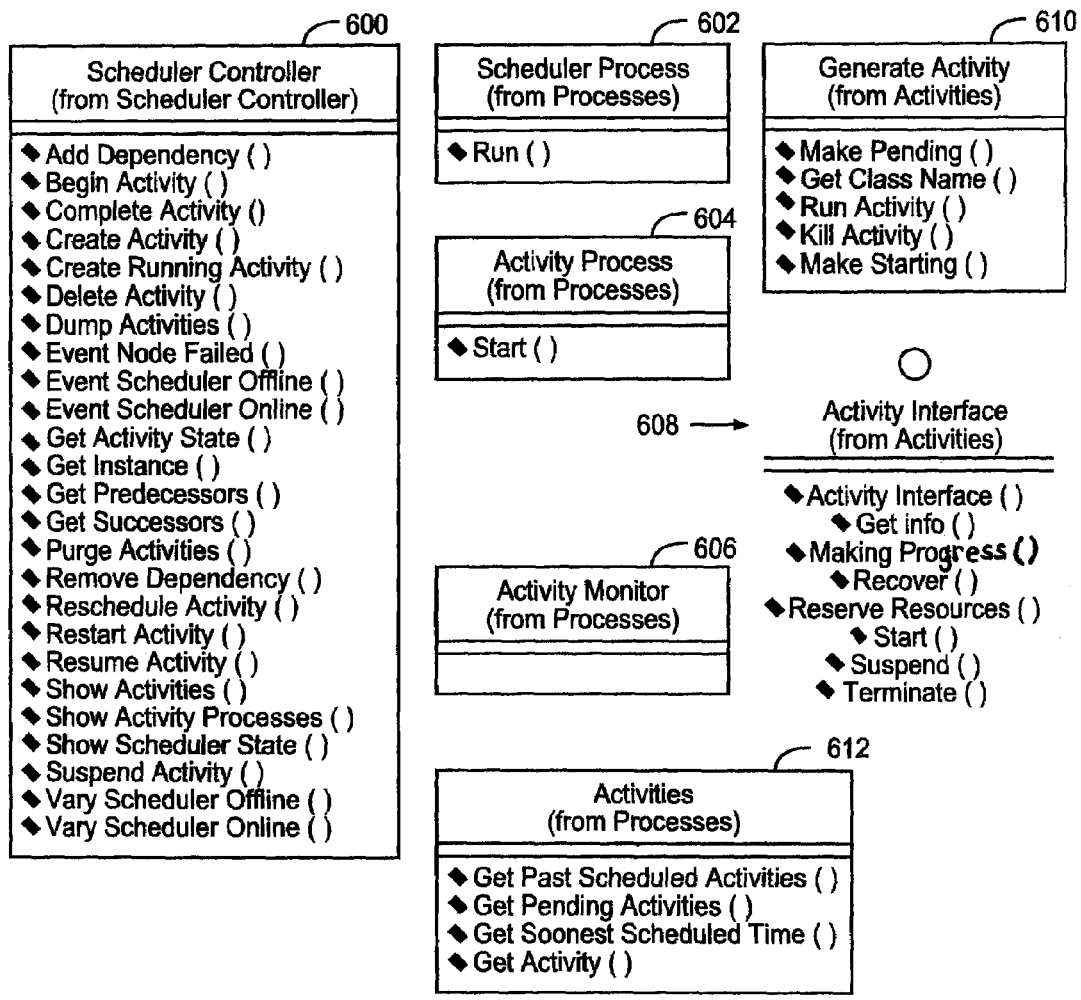
FIG. 10 illustrates the classes that make up the scheduler subsystem.

The classes that make up the scheduler subsystem are shown in FIG. 10.

As for most subsystems, the scheduler defines a controller class, SchedulerController 600. This is the primary external interface to the scheduler subsystem.

The scheduler subsystem defines three runnable classes, SchedulerProcess 602, ActivityProcess 604, and ActivityMonitor 606. The SchedulerProcess 602 is the actual scheduler. This is ran periodically to perform the scheduling actions. The ActivityProcess 604 is used to perform the actual activities. The ActivityProcess 604 is started by the scheduler, and uses the ActivityInterface 608 (defined below) to run the required actions. The ActivityMonitor 606 runs continuously and monitors all running activities to make sure they are making progress.

The scheduler defines a class, GenericActivity 610 and a JAVA interface, ActivityInterface 608, that are used to manipulate activities. GenericActivity 610 defines the objects which the scheduler tracks. GenericActivity 610 objects are used when the scheduler needs to only manage the generic activity without knowing the details of the specific activity. The actual working code of an activity is provided by the subsystem which defines the activity. A subsystem defines an activity by defining a class that implements ActivityInterface 608. When the scheduler subsystem needs to perform an action involving the real activity, it will use the ActivityInterface 608 methods. When activities are given to the scheduler to be managed, the scheduler is informed of the JAVA class name of the activity. Using JAVA reflection, scheduler subsystem code can construct objects of the specified class. The ActivityInterface 608 methods can then be used to manipulate the activity.

Internally the scheduler subsystem maintains a list of all activities. This is represented here as the Activities 612 class. Activities 612 are created with the createActivity and createRunningActivity methods in SchedulerController 600, and are removed with purgeActivities. Note that the scheduler subsystem code is unlikely to actually have an object called Activities.

Activity States

A list of activities is maintained in the scheduler subsystem. Activities may be in several different states.

Scheduled—The activity is not running. It is scheduled to run at a specific time.

Pending—The activity is not running. It should be running now, but is waiting for resources or the completion of predecessor activities.

Starting—The activity has been selected to start, and is in the process of being started.

Running—The activity is running in the system.

Suspended—The activity has been blocked from starting. If the activity was running, it has been stopped.

Suspending—The activity is running, but has been requested to stop. As soon as the activity reaches a clean stopping point, it must stop. Once stopped, the activity moves to suspended state.

Restarting—The activity is running, but has been requested to stop then restart. As soon as the activity reaches a clean stopping point, it must stop. Once stopped, the activity moves to pending state.

Deleting—The activity is running, but a delete has been requested. As soon as the activity reaches a stopping point, it will stop. Once stopped, the activity moves to deleted state.

Failed—The activity has ran, but failed.

Deleted—The activity has been explicitly deleted by an external (usually admin) command.

Completed—The activity has ran, and completed successfully.

When an activity is first created, it is usually placed into scheduled or pending state. A new activity is placed in scheduled state if it is to occur at a specific time, or onto pending state if it is to be started right away. The scheduler will move activities from pending to starting when resources become available to perform the activity, and the scheduler can start the process to perform the activity. As the activity actually starts, it will change to running state. Once the activity completes successfully, it becomes completed.

In some cases, an activity is performed by a process that is not started by the scheduler. The primary I/O performed by a host to or from the system is an example. The scheduler is expected, however, to manage successor activities, and to perform recovery if these processes are interrupted. In this case, as soon as the activity begins, the scheduler is notified that a running activity has been created.

Activities may have predecessors that are other activities. Activities with dependencies may not be started until the time to start has arrived and the predecessors have completed successfully. The scheduler can only start an activity if its predecessors have completed successfully.

A history is tracked for each activity. Each time the activity changes state, a history record is captured. The history records include a timestamp (a date, time, and timezone), the old state (null for a newly created activity), the new state, the actor causing the change (normally either "scheduler" if the change was made by a scheduler subsystem function or "external" if the change was made by an external call to a SchedulerController method), and an optional reason field.

Generic Activities and the Activity Interface

The scheduler subsystem does not know the details of the activities it manages. The activities are defined by other subsystems, and the scheduler simply manages the activities it is given. The scheduler subsystem defines a class, GenericActivity 610, that it uses to manage the activities under its control. In order to be manageable by the scheduler subsystem, an implementation of an interface, ActivityInterface 608, must be defined. When activities are created in the scheduler subsystem, a class name that implements ActivityInterface 608 must be provided. The scheduler will manipulate GenericActivity 610 objects. In turn, GenericActivity 610 objects will use JAVA reflection to get instances of the actual activity classes (i.e., implementations of ActivityInterface 608) to perform the necessary actions on the activity.

The ActivityInterface 608 class defines these methods:

start—Starts running the program (or programs) needed to perform the activity. Used both to start the activity the first time and to restart the activity after being suspended. This method must distinguish these two cases and perform the appropriate actions. This method must return a status (success, suspended, failed) and a reason for a failed result. Success means the start method has ran to completion without errors. Suspended means that it has run partially, but has stopped before all the work is completed. No errors have occurred. Failed means a non-recoverable error has occurred. A reason string is returned with the failed result that provides a description of what the failure was. After this method returns, any resources reserved by the reserveResource method must be released.

recover—Cleans up the activity after a crash or other situation where the activity has been suddenly stopped. This method must perform the necessary actions to place the activity into the same state as the suspend method. After this method returns, any resources reserved by the reserveResource method must be released. This method will return true if the recovery was successful. If the recovery is successful, then the activity can be restarted. If not, the activity becomes failed.

suspend—Temporarily stops the activity prior to completion. The suspend method should cause any running programs to terminate cleanly, and should leave the activity in a restartable state. Because some activities may take time to stop, this method is allowed to initiate the shutdown, and then return. This method will return true if the activity will be suspended, or false if the activity cannot be suspended.

terminate—Used as part of the restart/force or delete processing. Stops the activity prior to completion. The terminate method must cause the activity to terminate quickly (seconds). This interface will be used first for a forceful restart or a delete. If this method returns true, the process will be quickly terminated, and no further action is needed. If this method returns false, the process associated with the activity must be killed. A killed activity must be recovered (using the recovery method) before it can be restarted.

reserveResources—determines if the resources needed to run the activity are available. If so, the resources are reserved, and this method returns the node where the activity should be run. If not, no reservations are made, and the method returns NULL. The scheduler will only start an activity that can successfully reserve its needed resources. Once started on this node, the activity may also consume resources on other nodes.

makingProgress—returns true if the activity is making sufficient progress. Returns false if the activity has stalled, or has crashed. The scheduler may terminate activities that are not making progress.

getInfo—returns a string providing information about the activity. This is used to provide specific information about the activity that the scheduler subsystem is unaware of, including progress of running activities.

Constructor—A class that implements ActivityInterface must also define a constructor. This constructor must accept an activity id parameter and an arg list parameter. The arg list is an ArrayList of String arguments. Since these parameters must be stored in the database while the activity is waiting to run, only strings are allowed.

SchedulerController

The scheduler subsystem provides a class, SchedulerController 600, to provide an interface to the scheduler. The SchedulerController 600 follows the Controller/Domain Objects/Value Objects pattern. The SchedulerController 600 defines the following methods or groups of methods. Note that the actual routines may vary in details from those described below. Specifically, the usual convention of providing the ability to specify lists of arguments for many controller methods must be applied.

Void addDependency (predecessor, successor)—creates a dependency from predecessor activity to successor activity. The parameters are activityIds. The successor activity cannot be started before the predecessor has successfully completed. The successor can be in any state except completed, deleting, or deleted. The predecessor activity can be in any state except deleting or deleted. Note that this method has no effect on the current state of either the predecessor or the successor.

Void beginActivity (activityId, pid)—used to record the activity has actually started running. Records the pid of the activity in the scheduler database.

Void completeActivity (activityId, result)—notifies the scheduler that the activity specified by activityId has finished running. The result parameter will indicate the status of the completion. The state of the activity is changed to completed from running, deleting, suspending, or restarting if the result is success. If the result is suspended, the activity's state is changed to suspended from suspending, to deleted from deleting, or to pending from restarting or running. If the result is failed, the activity will be placed in failed state if its state was restarting, running or suspending; or into deleted if the state was deleting.

ActivityId createActivity (activityclass, args, startTime, priority, suspended, predecessors)—creates a new activity of the specified activityClass. This method returns the unique id of the new activity. The activityclass parameter must be the class name of a class that provides an implementation of ActivityInterface. The args parameter is an ArrayList of Strings that are the arguments for the constructor of the class named activityClass. These are stored by the scheduler and passed along to the constructor, scheduler does not do anything else with these arguments. The startTime parameter defines when the activity is to be started. If a startTime value is specified, the activity is placed into scheduled state. If null, the activity is immediately placed in pending state. Priority is the priority of the new activity, 1 being highest priority. The suspended flag, if true, indicates that the new activity should be immediately suspended. A suspended activity must be resumed before it will start. The predecessors parameter is a list of activity ids for activities that are predecessors for this activity.

ActivityId createRunningActivity (activityClass, args, priority, node)—creates a new activity in the running state. This method is used for activities that the scheduler must manage, but which are started externally. The activityClass parameter must be the class name of a class that provides an implementation of ActivityInterface. Priority is the priority of the new activity, 1 being highest priority. Node is the node id of the node where the activity is running. This method returns the unique id of the new activity.

Void deleteActivity (activityId)—causes the activity specified by activityid to be moved to deleted or deleting state. The state changes to deleted if the activity is not currently active. If the activity is active (i.e., in running, suspending, or restarting state) the state will be changed to deleting, and the ActivityInterface.terminate method will be used to attempt to stop the activity. If terminate returns false, a forced termination (kill) will be performed first on the activity. All successor activities are also deleted.

Void dumpActivities (startTime, endTime)—dumps all activities that were completed or deleted between startTime and endTime to a file. The file can be downloaded, then loaded into another database.

Void eventNodeFailed (node)—notifies the scheduler that the specified node has failed. All activities using the node must be recovered, then restarted.

Void eventSchedulerOffline ( )—disables the scheduler from automatically starting any activities. Does not affect the administrative state.

Void eventSchedulerOnline ( )—enables the scheduler. The scheduler process will run immediately. Does not affect the administrative state.

State getActivityState (activityId)—returns the current state of the activity at the time the call is made.

ArrayList getPredecessors (activityId)—returns a list of the activity ids of the predecessor activities for the specified activity.

ArrayList getSuccessors (activityId)—returns a list of the activity ids of the successor activities for the specified activity.

Void purgeActivities (startTime, endTime)—Deletes all activities and their associated information that became completed or deleted between startTime and endTime.

Void removeDependency (predecessor, successor)—removes the dependency between predecessor and successor. If no dependency exists this method returns without any error.

Void rescheduleActivity (activityId, startTime)—changes the start time of the activity specified by activityid to start- Time. Fails if the activity is in any state except scheduled or suspended. Does not cause a suspended activity to resume. This method has no effect on the current state of the activity.

Void restartActivity (activityId, force)—causes the activity specified by activityId to be suspended, then resumed. This is done using the normal suspend/resume processing if force is false. If force is true, the ActivityInterface.terminate method is used. If this returns true, the activity is restarted. If this returns false, the activity is immediately killed, then a recover is invoked on the activity. The activity is then restarted if the recovery is successful.

Void resumeActivity (activityId)—causes the activity specified by activityid to be resumed. Will make a failed activity go to pending state.

CompositeValue showActivities (activityIDs, activityTypes, activityStates, startTime, endTime, detail)—returns a CompositeValue of activities. The list will be filtered to include only activities specified in activityIDs, types in activityTypes, or in a state specified in the activityStates. Any activity where all or part of the interval from create time to complete or delete time for the activity falls into the specified time range are returned. The detail parameter controls whether or not the history is included. This method returns the activity class, id, arguments, current state, scheduled time, node id, priority, and activity info (running activities only, as returned by ActivityInterface.getInfo.) If history information is requested, it is returned as a sublist of values, each one containing the timestamp, old state, new state, actor, and reason. Predecessors and successors will also be included, if requested by the detail argument.

CompositeValue showActivityProcesses (NodeIds)—returns a CompositeValue with information about the currently active (running, suspending, deleting, or restarting states) activities running on the specified nodes.

CompositeValue showSchedulerState ( )—returns the current state of the SchedulerProcess.

Void suspendActivity (activityId)—causes the activity specified by activityId to be suspended. The activity will move to suspended state (if not running) or spending (if running).

Void varySchedulerOffline ( )—disables the scheduler from automatically starting any activities. Sets the administrative state offline.

Void varySchedulerOnline ( )—enables the scheduler. The scheduler process will run immediately. Sets the administrative state online.

Scheduler methods that cause changes to the activities must perform database transactions. In many cases, these changes are made as part of a larger transaction being performed by the caller. Two variants of these methods must be provided. One must take an externally supplied transaction object. A second does not take a transaction object and performs the transaction internally.

Scheduler

The scheduler is responsible for managing the activities. This includes moving activities from scheduled state to pending state when the scheduled time arrives. The scheduler is also responsible for starting pending activities.

Figure 11:
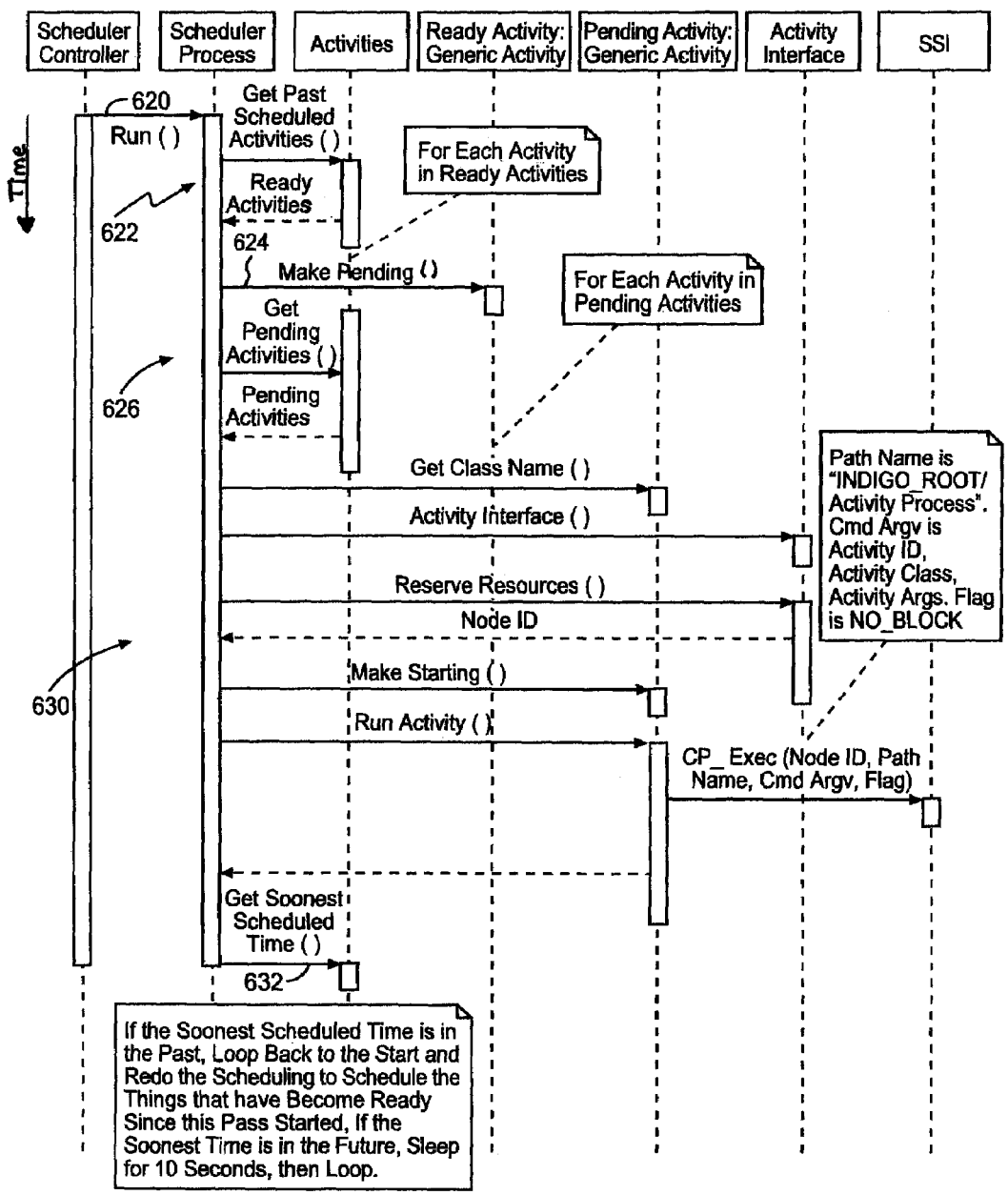
FIG. 11 illustrates operation of the scheduler.

The operation of the scheduler is shown in FIG. 11. As the scheduler runs 620, it will examine scheduled activities 622. Any scheduled activity that has a start time in the past will be made pending 624. The scheduler then examines pending activities 626, in order of priority (highest first) and age (oldest of the same priority first, based on the time it was first made pending). Each activity is checked to determine if any needed resources are available. If these resources are available, the activity will be started 630. Once the scheduler has started all the activities it can, it will reexamine the scheduled activities 632. It will determine the next time it must run based on the soonest time any activity is to be started. If this time is in the past, the scheduler will repeat the above actions. Once the scheduler finds a soonest scheduled time in the future, it will sleep for 10 seconds, then repeat the above actions.

The scheduler is a continuously running process.

Once activities complete, they are set to completed, deleted, failed, pending, or suspended state. It is expected that old, completed and deleted activities will be periodically purged to conserve space. Data may also be exported before purging so the data can be retained long term in a reporting system.

Starting of Activities

Figure 12:
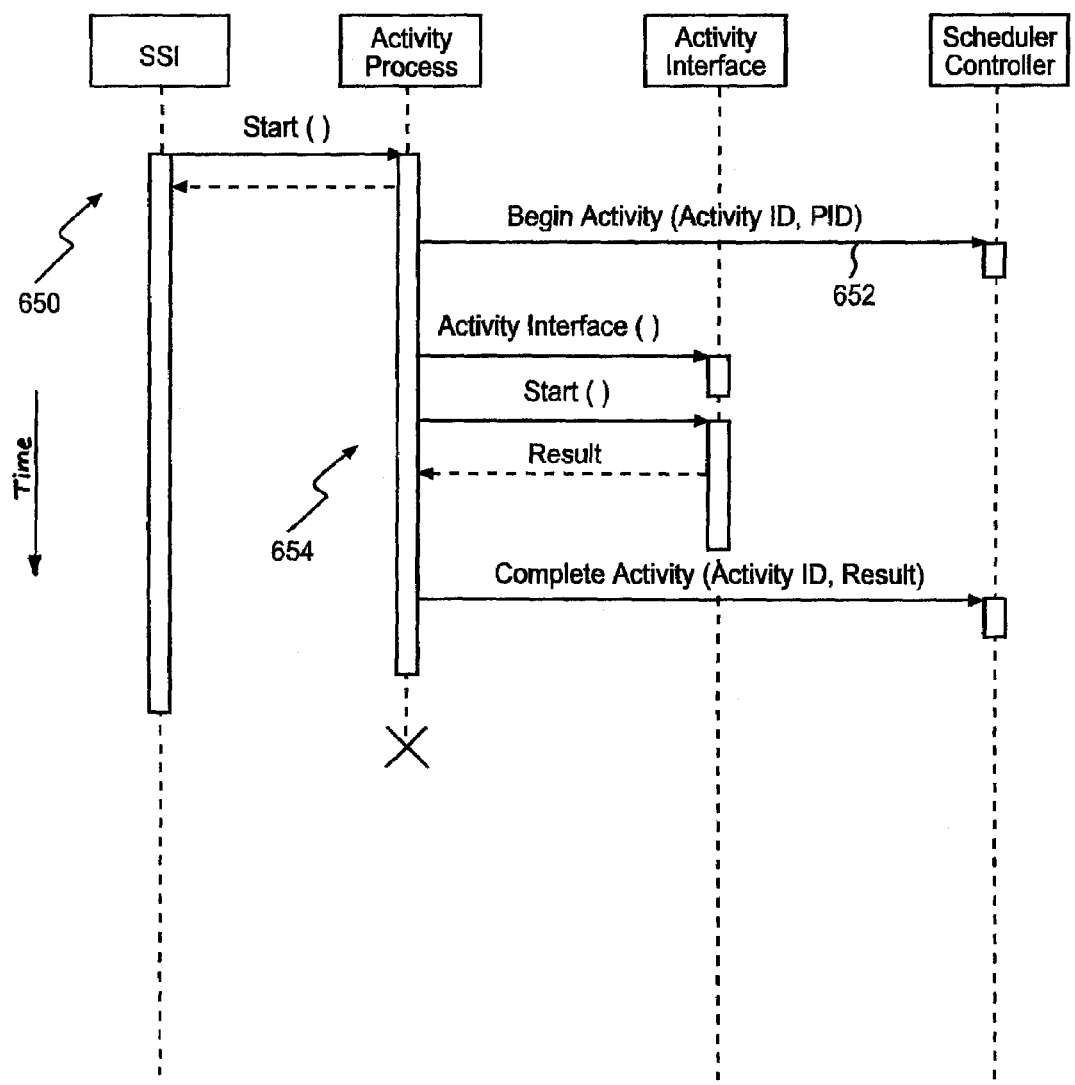
FIG. 12 illustrates the starting of activities.

When the scheduler has selected an activity to begin, it uses the ActivityProcess to run the activity. The starting of activities is shown in FIG. 12. The ActivityProcess is started on the selected node, and is given the information about the activity in question. The scheduler starts ActivityProcess on the selected node using the CP startup service 650. ActivityProcess first moves the activity from "starting" state to "running" state with the beginactivity method 652. ActivityProcess uses the ActivityInterface's start method to run the desired functions. Once the start method completes, Activity Process exits 654.

The actual function of the activity is completed during the call to ActivityInterface.start. This method is implemented by each of the implementations of ActivityInterface to perform the appropriate actions for the activity. This method will return one of three results:

Success—the activity has completed successfully. Successor activities can be ran.

Failed—the activity has completed, but was unsuccessful. ERROR severity Events will be logged to indicate the exact failure. The activity will be set to failed state (or deleted, if the previous state was deleting), and successor activities cannot be ran.

Suspended—the activity was suspended before completion.

Monitoring of Running Activities

While activities are running, suspending, deleting, or restarting they are consuming system resources. Activities are expected to be making progress at all times. These activities are actively monitored for progress. The ActivityMonitor process runs continuously and provides this monitoring. The ActivityMonitor is started during system startup and is managed by the HA service as part of Scheduler subsystems HA implementation. This continuously running process normally sleeps most of the time. Every few minutes, it wakes up, and checks running processes for progress. If an activity is not making progress, WARN events are logged. If this condition persists, the activity will be forcibly terminated, and ERR events logged. The definition of progress is determined by the activity itself. After the activity is forcibly terminated, a recovery is performed, and the activity may end up in a failed or pending state, depending on the result of the recovery. Note that in some cases, it is impossible to forcibly terminate a process. This occurs when the ActivityInterface.terminate method returns true, which indicates the activity will terminate quickly on its own, or if the activity does not have a pid. Such activities will continue to be logged until they terminate on their own or begin making progress again.

The activity monitor will also check that the pid associated with each activity is still alive. If not, a recovery is performed.

When it wakes up and begins executing, the activity monitor will query all of the activities that are in running, suspending, deleting, and restarting state. It uses a similar sequence of methods used for suspending activities. It calls the makingProgress method provided in ActivityInterface for each selected activity (i.e., running, suspending, deleting, or restarting activity). If the activity is making progress (as defined by the activity), the no-progress flag is cleared (if set) for the activity, and no further action is taken. If the activity is not making progress, and the no-progress flag is not set, the no-progress flag is set for the activity. A WARNING level event is logged for the activity. If no-progress flag is set for an activity that is not making progress, an ERROR level event is logged for the activity, and activity will be forcibly terminated.

It is important that the activity classes (i.e., the classes that implement ActivityInterface) provide an implementation of the makingProgress method consistent with their operation. If the activity only updates its progress at infrequent intervals, the response of makingProgress should be true until that interval has passed.

The ActivityMonitor will also watch for activities that have been in "starting" state for more than a few seconds. Normally, an activity will move through this state very quickly. However, if there is a problem starting the process to perform the activity, an activity may remain in this state. If this occurs, the ActivityMonitor will recovery the activity, and return it to pending state.

Suspending, Resuming, and Restarting Activities

Activities can run for a long time, up to many hours. In the event that the system or some of its components must be shutdown, it may be necessary to interrupt these long-running activities. This interruption can take one of two forms: a restart or a suspend/resume.

The scheduler subsystem provides interfaces to restart, suspend, resume, or recover a specific activity.

The suspend command causes a running activity to stop. This is accomplished by suspending the process using the suspend method defined in ActivityInterface. Suspending the activity allows the process to complete its work up to a consistency point. The process performing the activity can then cleanly terminate. The activity is changed to "suspending" state when the suspend action is initially performed. Once the activity actually stops, it will usually change to "suspended" state. However, it is possible that an activity could complete during the time when it is requested to suspend. In this case, the activity changes to "completed" state.

Note that the actual suspension is handled in the implementation of the activity class. The scheduler simply requests that the activity suspend itself using the ActivityInterface.suspend method. It is up to the class that implements ActivityInteface to perform the necessary actions to stop.

Figure 13:
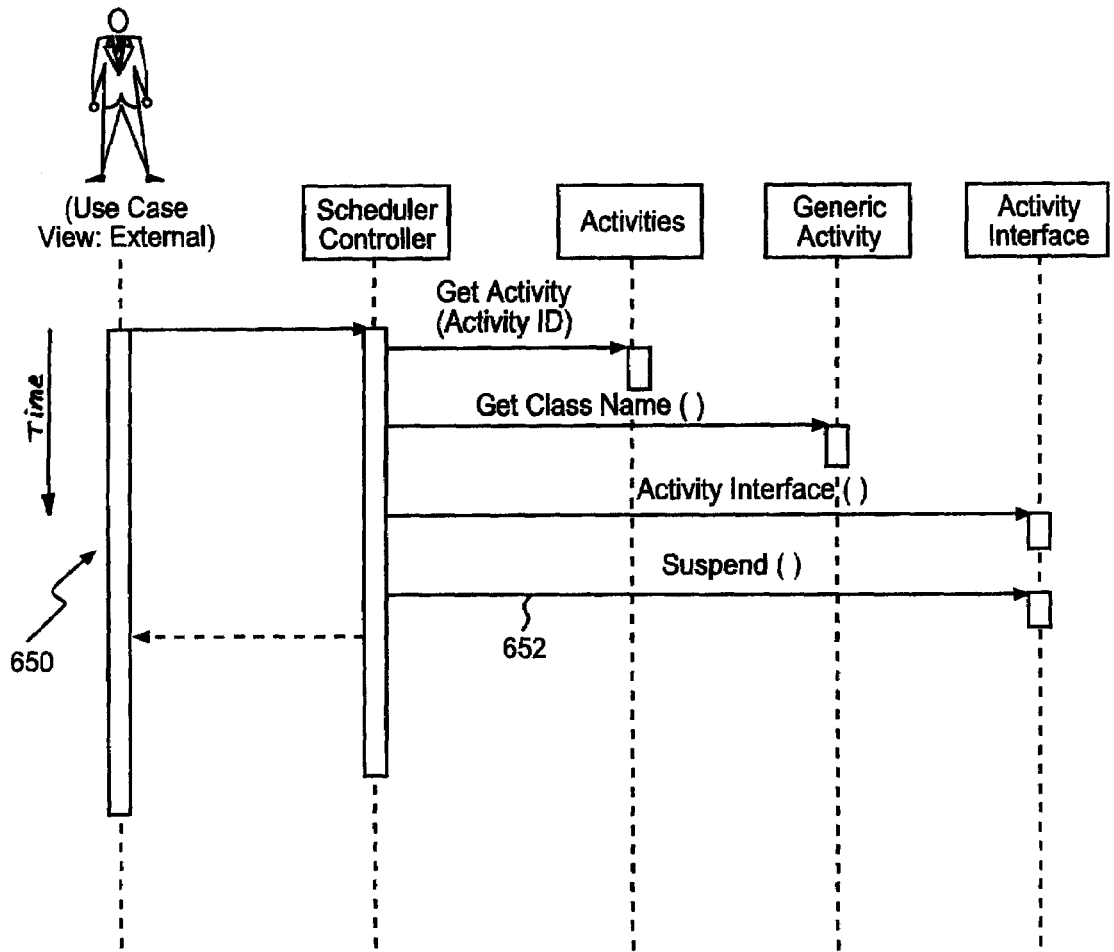
FIG. 13 illustrates the processing for suspending a running activity.

The processing for suspending a running activity is shown in FIG. 13. The processing for restart is similar. Internal state changes within the scheduler subsystem are not shown in these or other sequence diagrams.

Suspending a scheduled or pending activity is simply a matter of changing the activities state to suspended. In FIG. 13, suspending the method using the suspend method defined in ActivityInterface is indicated at 650. The use of the suspend method is specifically indicated at 652.

A resume command causes a previously suspended activity to restart. This is done by changing the state of the activity to pending or scheduled from suspended. Once in pending or scheduled state, the activity will be restarted by the normal scheduler processing. If an activity is in suspending state, it is changed to restarting. The resume command has no effect on activities in restarting state.

A restart command causes a running activity to stop, then puts the activity back through the resource allocation process, and lets it immediately continue. This is accomplished by suspending the process using the suspend method defined in ActivityInterface. Unlike the suspend command described above, however, the activity is changed to "restarting" state when the suspend action is initially performed. Once the activity actually stops, it will usually change to "pending" state. However, it is possible that an activity could complete during the time when it is requested to suspend. In this case, the activity changes to "completed" state.

Figure 14:
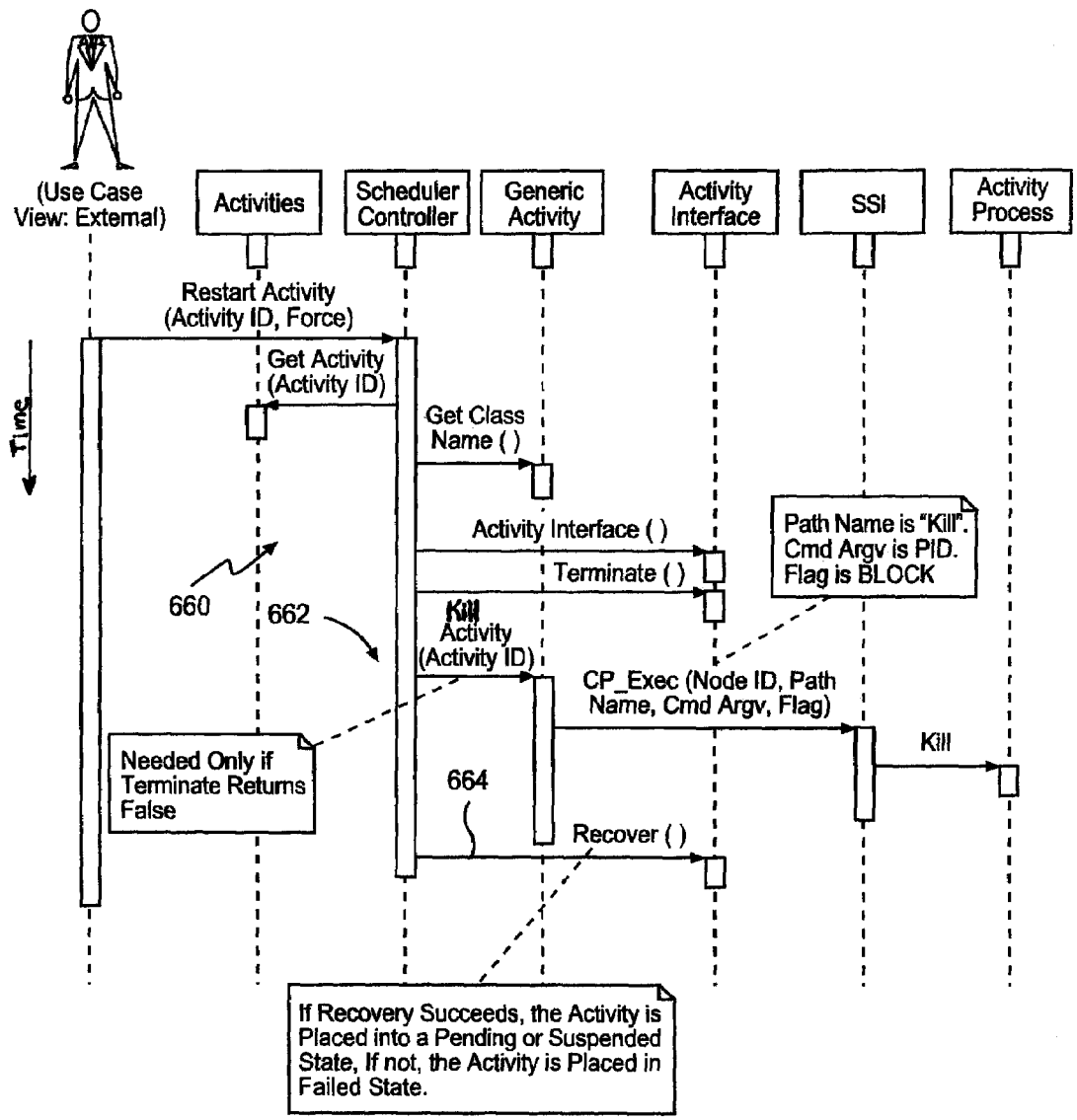
FIG. 14 illustrates a sequence diagram for a forced restart.

The SchedulerController provides the ability to forcefully restart an activity. A sequence diagram for a forced restart is shown in FIG. 14. This is used to override the normal suspension/resume processing that normally occurs when an activity is restarted. In this case, the activity's ActivityInterface.terminate method is first used to terminate the activity 660. This method must perform any activity specific termination. If this method returns true, this indicates the activity will terminate quickly on its own. If terminate returns false, then the ActivityProcess that is running to perform the activity is killed using the "kill" command 662. This will force the activity to be immediately terminated, rather than waiting for a clean termination. After being killed, the activity must be recovered using the recover method provided in the ActivityInterface 664. If the recovery is successful, the activity will be placed in the pending state (or suspended if the previous state was suspending) and is then restarted just as for a normal suspension. If the recover method fails, the activity will be placed in a failed state.

In some cases, the scheduler may be taken offline before restarting a process. This would be done before a system shutdown. By first taking the scheduler offline, then restarting activities, these activities will stop quickly, and will be returned to a pending state. This allows for a quick shutdown, and also automatically restarts these activities when the system restarts.

Recovery

When the system is shut down, it will suspend running activities that are suspendable, and it will allow non-suspendable activities to complete. When the system crashes, there is no opportunity to allow a clean shutdown. Activities will be left in an incomplete state, and a recovery process must be performed to clean up such activities. A similar process is performed for affected activities when a component failure occurs that causes activities to be terminated abnormally. The recovery process must be performed when an activity is forcefully restarted.

During startup, the scheduler subsystem's startup process (SchedulerBootstrap) examines the activity list for activities in the starting, running, suspending, deleting, or restarting states. After a normal shutdown, there will be no activities in these states. After a crash, however, activities that were running when the crash occurred will be left in the starting, running, suspending, deleting, or restarting states. To recovery these activities, the scheduler simply calls the ActivityInterface.recover method for each activity. These invocations will either succeed or fail. In either case, the recovery method must "clean up any mess" left behind by the crashed process. If the recovery succeeds, the activity is left in pending (if it was starting, running or restarting), deleted (if it was deleting), or suspended (if it was suspending) state, and will be restarted once the system is fully running. If the recovery fails, the activity is left in failed state or deleted if it was in deleting state.

When a single node or a port fails, some activities may be affected. This will result in processes that are performing activities just disappearing, in the case of a node failure. When the scheduler subsystem is notified of a node failure, it must perform a recovery on all activities that were running on the affected node. This will result in these activities becoming either pending (if previously starting, running or restarting), deleted (if previously deleting) or suspended (if previously suspending) if the recovery is successful. If the recovery fails, the activity is left in failed state or deleted if it was in deleting state.

The failure of a port will cause the activity to receive an I/O error. When this happens, the start process will either recover from this error on its own, or the start method will return with a "failed" result. When a failed result is returned, the activity is placed in failed state, unless it was previously deleting in which case it is placed in deleted state.

Figure 15:
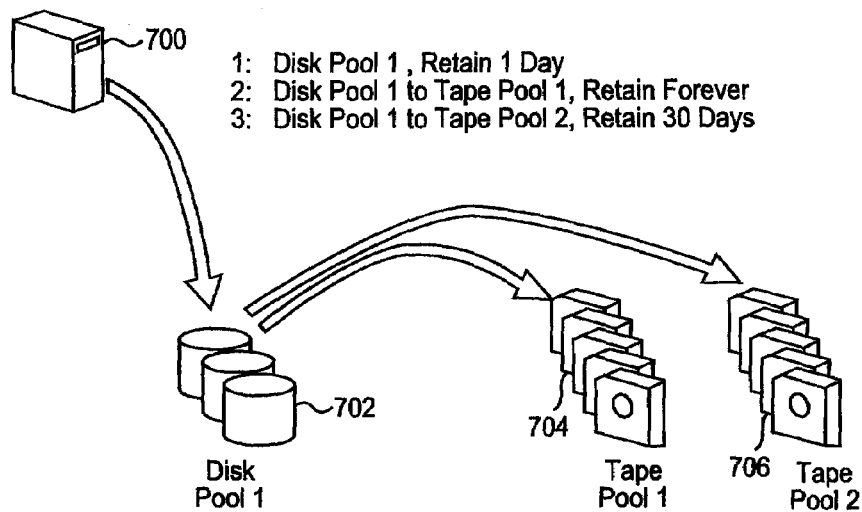
FIG. 15 illustrates an exemplary storage management policy that may be implemented by the scheduler.
Figure 16:
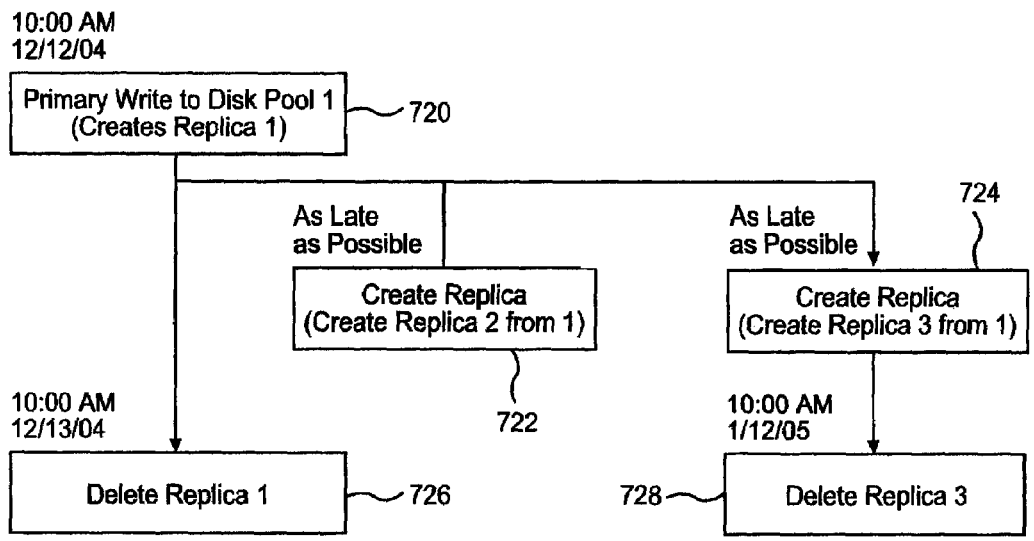
FIG. 16 illustrates translation of the policy of FIG. 15 into a series of activities.

In the preferred embodiment, the automated activity scheduler is used to implement storage management policies. FIG. 15 illustrates use of the scheduler to implement an exemplary storage management policy. FIG. 16 illustrates translation of this exemplary storage management policy into a series of activities. According to the exemplary policy, writes from system 700 to first disk pool 702 are retained for one day. The written information is replicated at first tape pool 704 and second tape pool 706. The replica in first tape pool 704 is retained forever. The replica in second tape pool 706 is retained for 30 days.

The series of activities representing this storage management policy is shown in FIG. 16. More specifically, the primary write to the disk pool is indicated at block 720. The creation of the replicas in the tape pools is shown at blocks 722 and 724. At block 726, the first replica (the primary write to the disk pool) is deleted in accordance with the single day retention policy. At block 728, the replica in second tape pool 706 is deleted in accordance with the 30 day retention policy.

In addition to the many concepts already described, the invention also comprehends an approach to automatically suspending background activities. This aspect of the invention addresses the potential problem of background activities delaying virtual tape volume mount because the background activities are using the same media or devices as are needed for the mount.

A virtual tape library system must perform extensive background processing activities. The main activities are those that automatically move data between disk and tape according to the policies set in the system. Other activities include reclamation activities that may be done on disk or tape media. However, when a host requests a mount of a virtual tape volume, the request must be honored as quickly as possible. The invention comprehends a mechanism for automatically suspending background activities that could otherwise delay the virtual tape volume mount because those background activities are using the same media or devices as are needed for the mount.

More specifically, the scheduler may be used in conjunction with the storage management policies to provide automatic suspension of background activities. The storage management policies define the background activities that occur for a virtual tape volume, either directly or indirectly. Direct background activities are those that move data between different media, such as disk to tape movement. Indirect activities may be created, for example, when disk utilization exceeds a defined threshold. In either case, a virtual tape volume mount takes precedence over background activities.

In the preferred embodiment, the mechanism for automatically suspending the background activities is the suspend/restart processing provided by the scheduler. When the VTV mount occurs, the VTV is checked to see if it is being used by any background activities. In the event that the VTV is being used by background activities, the background activities are suspended using the scheduler capability. The scheduler initiates the suspend process (FIG. 13), but it is up the background activity to actually stop.

IO activities are notified by the scheduler that they should stop. Upon detecting the notification, and then reaching a good stopping point (i.e., all buffered data is written to physical media), an IO activity will exit. The exit status to the scheduler indicates to the scheduler that the activity is incomplete, and must be restarted. The activity will record its exit point so that it may resume its work from the point where it left off upon restarting.

When IO to the mounted VTV is completed, the VTV is dismounted. The dismount process will look for any suspended activities. These activities may be invalidated by the IO done to the VTV. For example, a copy of the VTV that was being written to tape is invalidated if the VTV is overwritten. If the activities are still valid, they will be resumed. Once an activity is resumed, the scheduler will restart the activity, as soon as the necessary resources (e.g., a real tape drive) are available.

Figure 17:
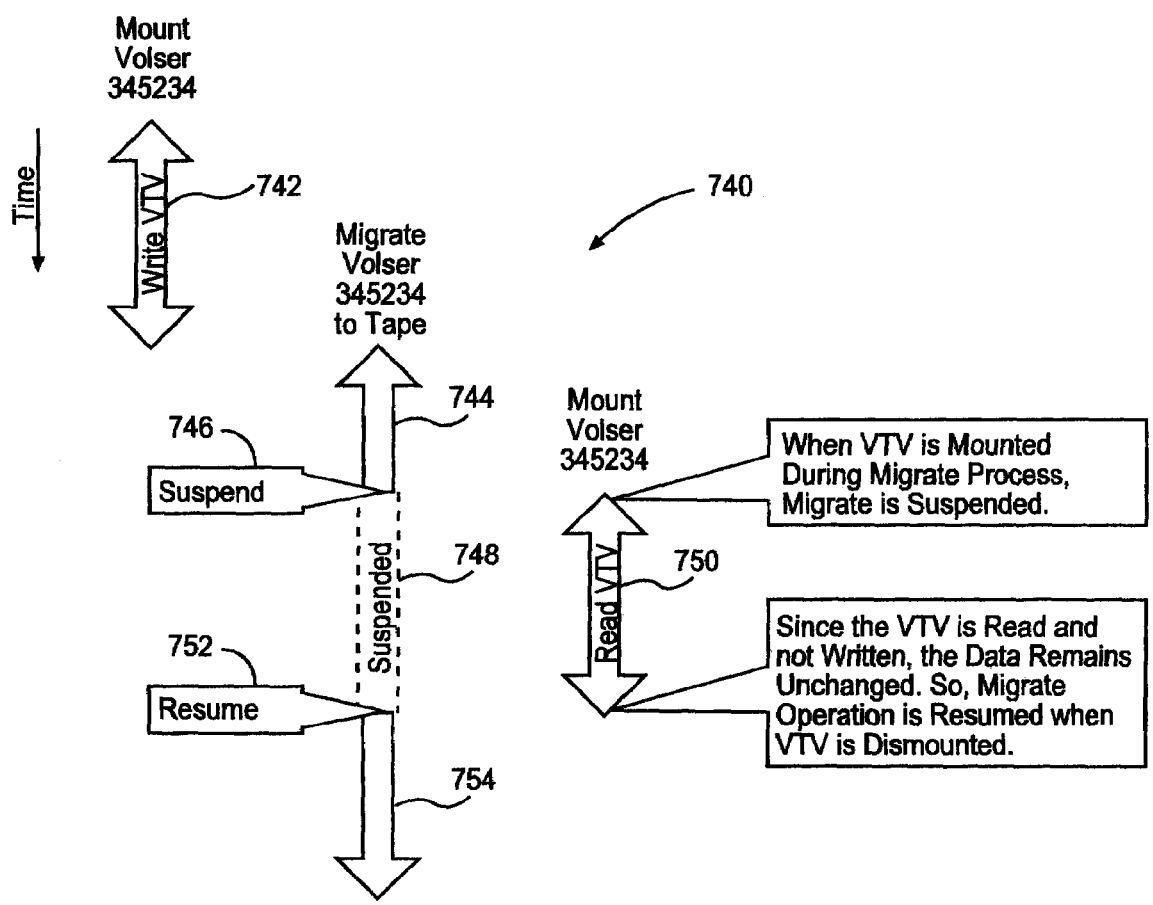
FIG. 17 illustrates an example of the automated suspension of background activities by the scheduler.

FIG. 17 illustrate an example of the automatic suspension of background activities at 740. As shown, write activity to a VTV is indicated at 742. At 744, migration is conducted in accordance with the system storage management policies. When the VTV mount occurs, the migration background activity is suspended 746, 748. The scheduler initiates this suspension process, and IO activities stop when reaching a good stopping point. This allows the VTV read activity to occur at 750.

When IO to the VTV is completed, it is dismounted and the migration background activity resumes 752, 754. In this example, the migration activity is still valid and is resumed because the data remained unchanged as the intervening IO operation was a reading and not a writing operation.

In another aspect of the invention, the automated repair of damaged objects is comprehended. Media and device errors do occur with existing devices. Tape media are particularly susceptible to errors that render the media unreadable or partially unreadable. As well, disk drives may encounter errors that cause data to be lost.

Figure 18:
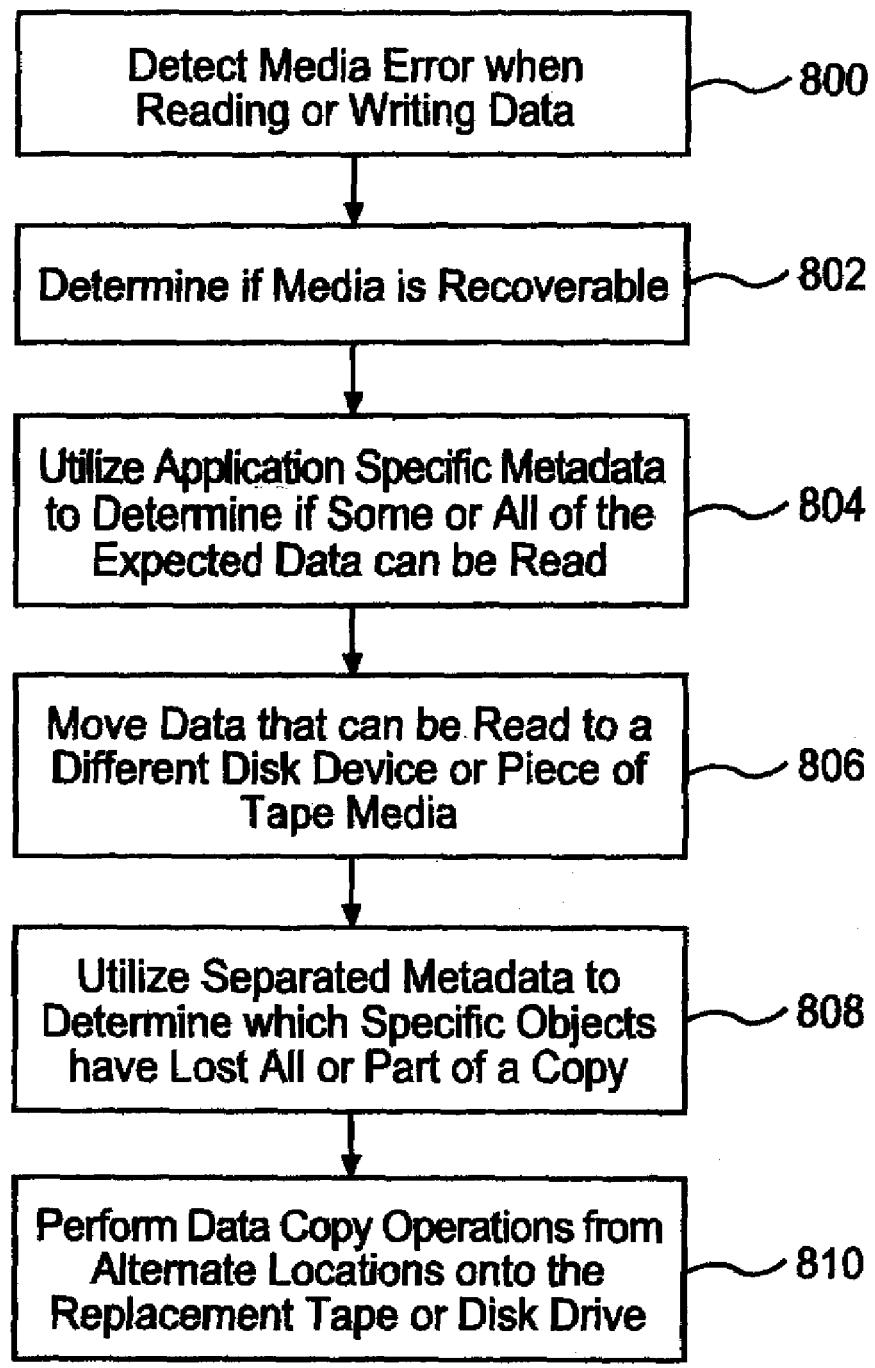
FIG. 18 illustrates an example of automated repair of damaged objects.

An approach to addressing this problem involves automatically dealing with IO errors and reconstructing data on damaged media or devices. An exemplary approach is illustrated in FIG. 18.

The first step is detecting that there has been an error (block 800). This is straightforward as the devices will report errors when trying to read or write data. Once an error has been detected, diagnostic procedures are applied to determine if the media (disk or tape) is unrecoverable (block 802). These procedures involve attempting to read and write on the suspect media. If the initial errors are confirmed, application specific metadata is used to determine if some or all of the expected data can be read (block 804). Any data that can be read is then moved to a different disk device or piece of tape media (block 806).

Data that cannot be read is lost. The missing data may be able to be reconstructed if other copies of the data are available in accordance with the system storage management policies for the particular data involved. That is, if other copies of the data are available, then these additional copies can be used to reconstruct missing data. By examining metadata about the stored objects that are kept separate from the data itself, the extent of the data loss can be determined. In the preferred embodiment, this separated metadata is managed by the object store metadata subsystem 92 (FIG. 3). This process determines which specific objects have lost all or part of a copy (block 808). Data copy actions are performed to copy data from alternate locations onto a replacement tape or disk drive (block 810).

It is appreciated that this comprehended approach to automatically dealing with IO errors and reconstructing data on damaged media or devices has many advantages. In particular, the combination of application specific metadata utilized for recovering data with storage management policies utilized for allowing reconstruction of missing data provides a way to repair damaged objects at a high level that is independent of the underlying storage. This technique can be used in combination with low level protection techniques, such as RAID or RAIT.

In another advantage, this approach may be used when reading a copy of a data object by an external application. If fatal IO errors occur in the copy being read, an alternate copy can be used. This allows the external application to be unaware of the IO error. The same diagnostics processes can be applied to determine the extent of the damage and to repair lost object copies. In particular, the application specific metadata together with suitable storage management policies and the separation of data objects from the underlying storage provides a system that is flexible as well as robust, and that may be enhanced with additional low level protection techniques.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. For use in a virtual data storage system for use with a client system and a plurality of physical storage devices, the virtual data storage system including a device emulator for receiving commands and data from the client system and a storage system for storing the data to the plurality of physical devices in accordance with storage management policies, a method of reconstructing data on damaged devices, the method comprising:

receiving, at the device emulator, commands and data from the client system;

converting the received data into a data object;

generating object specific metadata for the data object;

storing the data object and the object specific metadata to the plurality of physical devices in accordance with the storage management policies, the object specific metadata being stored together with the data object with the object specific metadata embedded into the data object;

storing a separate copy of the object specific metadata to the plurality of physical devices, the separate copy being stored separate from the data object;

detecting an error when attempting to access the data object; and after detecting the error, determining an extent of data loss by examining the separate copy of the object specific metadata.

2. The method of claim 1 further comprising:

if at least one other copy of the data object is available in accordance with the storage management policies for the data object, reconstructing the data object based on the at least one other copy of the data object; and storing the reconstructed data object to replacement storage media.

3. The method of claim 1 further comprising:

upon detecting the error, determining if storage media storing the data object is unrecoverable, and in the event that the storage media is unrecoverable, proceeding to determine the extent of data loss.

4. The method of claim 3 wherein determining if the storage media is unrecoverable involves attempting to read and write on the storage media.

5. The method of claim 1 further comprising:

storing application specific metadata with the data object when the data object is stored; and upon detecting the error, utilizing the application specific metadata to determine if any data in the data object can be read.

6. The method of claim 1 wherein storing the data object further comprises:

storing the data object utilizing a low level data protection technique.

7. The method of claim 6 wherein the low level protection technique includes the use of a redundant array of independent disks.

8. The method of claim 6 wherein the low level protection technique includes the use of a redundant array of independent tapes.

9. A virtual data storage system for use with a client system and a plurality of physical storage devices, the virtual data storage system comprising:

a device emulator for receiving commands and data from the client system and converting the received data into a data object;

a storage system for storing the data object and object specific metadata to storage media in accordance with storage management policies, the object specific metadata being stored together with the data object with the object specific metadata embedded into the data object; and for storing a separate copy of the object specific metadata to storage media, the separate copy being stored separate from the data object; and a metadata system for, upon detecting an error when attempting to access the data object, determining an extent of data loss by examining the separate copy of the object specific metadata.

10. The system of claim 9 wherein if at least one other copy of the data object is available in accordance with the storage management policies for the data object, the data object is reconstructed based on the at least one other copy of the data object, and the reconstructed data object is stored to replacement storage media.

11. The system of claim 9 wherein the storage system stores application specific metadata with the data object when the data object is stored, and wherein the application specific metadata is utilized by the metadata system to determine if any data in the data object can be read.

12. The system of claim 9 wherein the storage system stores the data object utilizing a low level data protection technique.

13. The system of claim 12 wherein the low level protection technique includes a redundant array of independent disks.

14. The system of claim 12 wherein the low level protection technique includes a redundant array of independent tapes.

* * * * *